United States Patent
Park et al.

(10) Patent No.: US 10,732,776 B2
(45) Date of Patent: Aug. 4, 2020

(54) INPUT SENSING UNIT AND ELECTRONIC APPARATUS INCLUDING THE SAME

(71) Applicant: Samsung Display Co., Ltd., Giheung-Gu, Yongin-Si (KR)

(72) Inventors: Sungkyun Park, Hwaseong-si (KR); Sangyoun Han, Seoul (KR); Inseo Kee, Asan-si (KR)

(73) Assignee: Samsung Display Co., Ltd. (KR)

( * ) Notice: Subject to any disclaimer, the term of this patent is extended or adjusted under 35 U.S.C. 154(b) by 70 days.

(21) Appl. No.: 16/006,410

(22) Filed: Jun. 12, 2018

(65) Prior Publication Data

US 2019/0121463 A1    Apr. 25, 2019

(30) Foreign Application Priority Data

Oct. 25, 2017   (KR) .................. 10-2017-0139534

(51) Int. Cl.
    *G06F 3/033*     (2013.01)
    *G06F 3/044*     (2006.01)
    *G06F 3/041*     (2006.01)

(52) U.S. Cl.
CPC ............ *G06F 3/044* (2013.01); *G06F 3/0443* (2019.05); *G06F 3/0445* (2019.05); *G06F 3/0446* (2019.05); *G06F 3/04164* (2019.05); *G06F 3/041662* (2019.05); *G06F 2203/04111* (2013.01)

(58) Field of Classification Search
USPC ................ 345/173, 174, 156, 158; 200/600; 349/12
See application file for complete search history.

(56) References Cited

U.S. PATENT DOCUMENTS

| | | | |
|---|---|---|---|
| 9,542,055 B2 | 1/2017 | Yang et al. | |
| 9,575,583 B2 | 2/2017 | Woo et al. | |
| 9,830,025 B2 | 11/2017 | Han et al. | |
| 2013/0062181 A1* | 3/2013 | Tokura ................. | H03K 17/962 200/600 |
| 2014/0111711 A1* | 4/2014 | Iwami ..................... | B32B 7/02 349/12 |
| 2015/0116252 A1* | 4/2015 | Park ....................... | G06F 3/044 345/173 |
| 2017/0031490 A1* | 2/2017 | Hashida ................. | G06F 3/044 345/174 |
| 2017/0336907 A1* | 11/2017 | Jeong .................... | G06F 3/0416 345/173 |

(Continued)

FOREIGN PATENT DOCUMENTS

| | | |
|---|---|---|
| KR | 10-1274649 B1 | 6/2013 |
| KR | 10-2015-0027529 A | 3/2015 |
| KR | 10-2019-0016174 A | 2/2019 |

*Primary Examiner* — Thuy N Pardo
(74) *Attorney, Agent, or Firm* — Innovation Counsel LLP

(57) ABSTRACT

An electronic apparatus may include a plurality of first sensor patterns and a plurality of second sensor patterns, each of which includes an outer line and an inner line, a plurality of first connection patterns electrically connecting the plurality of first sensor patterns, a plurality of second connection patterns electrically connecting the plurality of second sensor patterns, the second connection patterns being provided at a level different from that of the plurality of first connection patterns, and a third sensor pattern provided in an internal region enclosed by the inner line in a plan view.

20 Claims, 20 Drawing Sheets

(56) References Cited

U.S. PATENT DOCUMENTS

| | | | |
|---|---|---|---|
| 2018/0059837 A1* | 3/2018 | Kim | G06F 3/0412 |
| | | | 345/173 |
| 2018/0164925 A1* | 6/2018 | Jang | G06F 3/044 |
| | | | 345/173 |
| 2019/0042020 A1 | 2/2019 | Kim et al. | |
| 2019/0042052 A1* | 2/2019 | Jeong | G06F 3/044 |
| | | | 345/174 |
| 2019/0339813 A1* | 11/2019 | Chan | G06F 3/0418 |
| | | | 345/156 |

* cited by examiner

INPUT SENSING UNIT AND ELECTRONIC APPARATUS INCLUDING THE SAME

CROSS-REFERENCE TO RELATED APPLICATIONS

This U.S. non-provisional patent application claims priority under 35 U.S.C. § 119 to Korean Patent Application No. 10-2017-0139534, filed on Oct. 25, 2017, in the Korean Intellectual Property Office, the entire contents of which are hereby incorporated by reference.

BACKGROUND

The present disclosure relates to an input sensor and an electronic apparatus including the same.

An electronic apparatus is activated by an electrical signal. The electronic apparatus includes an input sensor, which is configured to sense a variety of inputs provided from the outside. To improve a user's convenience, the input sensor is used alone or as a part of a display panel for displaying an image.

The input sensor includes electrode patterns which are activated by electrical signals. A region, in which the electrode patterns are arranged, may be defined as an active area. The active area of the electronic apparatus may display information or respond to a touch event applied from the outside.

SUMMARY

Some embodiments of the inventive concept provide an input sensor, which is configured to realize both of self- and mutual-capacitance sensing methods, and an electronic apparatus including the same.

According to some embodiments of the inventive concept, an electronic apparatus may include a plurality of first sensor patterns and a plurality of second sensor patterns, each of which includes an outer line and an inner line, a plurality of first connection patterns electrically connecting the plurality of first sensor patterns, a plurality of second connection patterns electrically connecting the plurality of second sensor patterns, the second connection patterns being provided at a level different from that of the plurality of first connection patterns, a third sensor pattern, and a wiring line connected to the third sensor pattern. The inner lines of the plurality of first sensor patterns and the plurality of second sensor patterns may enclose internal regions, respectively, and the third sensor pattern is provided in at least one of the internal regions, when viewed in a plan view.

In some embodiments, the plurality of first sensor patterns and the plurality of second sensor patterns may be provided to sense a touch event from an outside using a variation in mutual-capacitance therebetween, and the third sensor pattern may be configured to sense a touch event from an outside using a variation in self-capacitance thereof.

In some embodiments, the electronic apparatus may further include an insulating layer provided between the plurality of first connection patterns and the plurality of second connection patterns. The plurality of first connection patterns and the wiring line may be provided at a first level below the insulating layer, and the plurality of first sensor patterns, the plurality of second sensor patterns, and the plurality of second connection patterns may be provided at a second level on the insulating layer. The plurality of first sensor patterns may electrically connect to the plurality of first connection patterns.

In some embodiments, the third sensor pattern may include a first sub-sensor pattern, which is provided at the first level and is connected to the wiring line, and a second sub-sensor pattern, which is provided at the second level. The second sub-sensor pattern may be electrically connected to the first sub-sensor pattern.

In some embodiments, the third sensor pattern may be located at the second level, and the third sensor pattern may electrically connect to the wiring line.

In some embodiments, the third sensor pattern may be located at the first level, and when viewed in a plan view, the third sensor pattern may be not overlapped with the plurality of first sensor patterns and the plurality of second sensor patterns.

In some embodiments, the electronic apparatus may further include a dummy pattern provided in at least one of internal regions, when viewed in a plan view. The third sensor pattern may be not overlapped with the dummy pattern, when viewed in a plan view.

In some embodiments, the dummy pattern may be located at the second level.

In some embodiments, when viewed in a plan view, the third sensor pattern is provided in a plurality, and each of the plurality of third sensor patterns may be provided in each of at least two of the internal regions in a one-to-one corresponding manner.

In some embodiments, when viewed in a plan view, the third sensor pattern is provided in a plurality, and the plurality of third sensor patterns may be provided in one of the internal regions.

In some embodiments, when viewed in a plan view, the third sensor pattern is provided in a plurality, each of the plurality of third sensor patterns is provided in each of at least two of internal regions in a one-to-one corresponding manner, and the plurality of third sensor patterns may be electrically connected to each other, thereby constituting a single sensor electrode.

In some embodiments, the electronic apparatus may further include a first sensing driver part, which is electrically connected to the plurality of first sensor patterns and the plurality of second sensor patterns, and a second sensing driver part, which is electrically connected to the third sensor pattern. The first sensing driver part and the second sensing driver part may be simultaneously driven to sense a touch event using the plurality of first sensor patterns, the plurality of second sensor patterns, and the third sensor pattern.

In some embodiments, the electronic apparatus may further include a first sensing driver part electrically connected to the plurality of first sensor patterns and the plurality of second sensor patterns, a second sensing driver part electrically connected to the third sensor pattern, and a controller controlling the first sensing driver part and the second sensing driver part. The first sensing driver part and the second sensing driver part may be driven in a first mode, in which the first sensing driver part and the second sensing driver part are simultaneously driven, a second mode, in which the first sensing driver part and the second sensing driver part are alternately driven, a third mode, in which only the first sensing driver part is driven, or a fourth mode, in which only the second sensing driver part is driven.

According to some embodiments of the inventive concept, an electronic apparatus may include a display panel displaying an image, self-capacitance sensor patterns provided on the display panel, each of the self-capacitance sensor patterns being used to sense an external touch event using a variation in self-capacitance thereof, and first sensor patterns and second sensor patterns provided on the display panel, an opening overlapped with the self-capacitance sensor patterns being defined in each of the first and second sensor patterns, when viewed in a plan view. The first sensor patterns and the second sensor patterns may be configured to sense an external touch event using a variation in mutual-capacitance therebetween.

In some embodiments, when viewed in a plan view, the self-capacitance sensor patterns may be overlapped with the openings of some patterns of the first sensor patterns and the second sensor patterns in a one-to-one corresponding manner.

In some embodiments, when viewed in a plan view, the opening of one of the first sensor patterns or the second sensor patterns may be overlapped with the self-capacitance sensor patterns.

In some embodiments, two or more adjacent self-capacitance sensor patterns may be connected to each other, thereby constituting a single sensor electrode.

In some embodiments, each of the self-capacitance sensor patterns may include a first sub-sensor pattern provided on the display panel, and a second sub-sensor pattern connected to the first sub-sensor pattern through a contact hole formed in an insulating layer which is provided to cover the first sub-sensor pattern. The second sub-sensor pattern is provided at the same level as the first sensor patterns and the second sensor patterns.

According to some embodiments of the inventive concept, an input sensor may include a plurality of dummy patterns, a plurality of sensor patterns electrically disconnected from the plurality of dummy patterns, each of the plurality of sensor patterns being provided to enclose each of the plurality of dummy patterns, and wiring lines electrically connected to at least one of the plurality of dummy patterns. The plurality of dummy patterns may include operation dummy patterns connected to the wiring lines, and the operation dummy patterns may be used to sense a touch event from an outside using a variation in self-capacitance thereof.

In some embodiments, the plurality of sensor patterns may be used to sense a touch event from an outside using a variation in mutual-capacitance therebetween.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
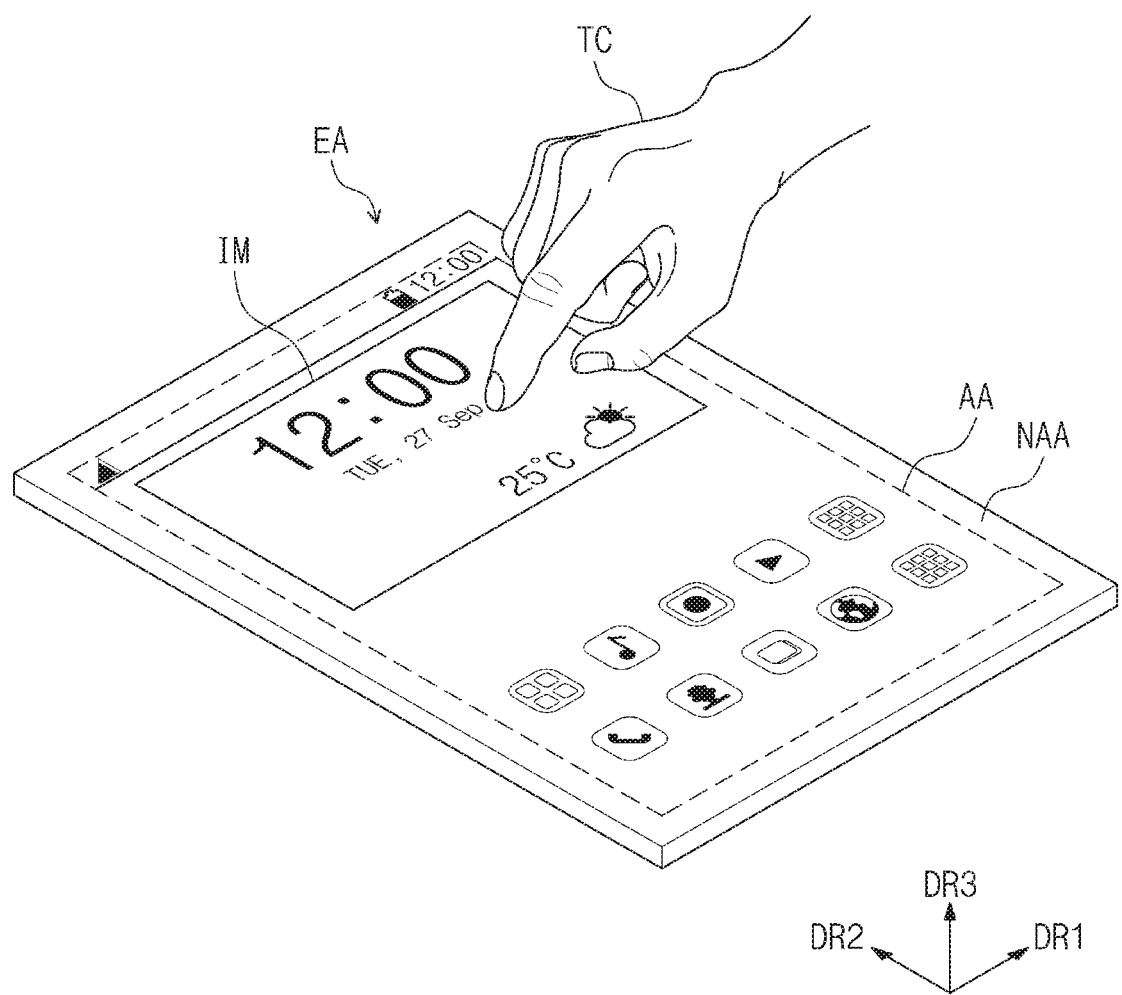
FIG. 1 is a perspective view illustrating an electronic apparatus according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Figure 2:
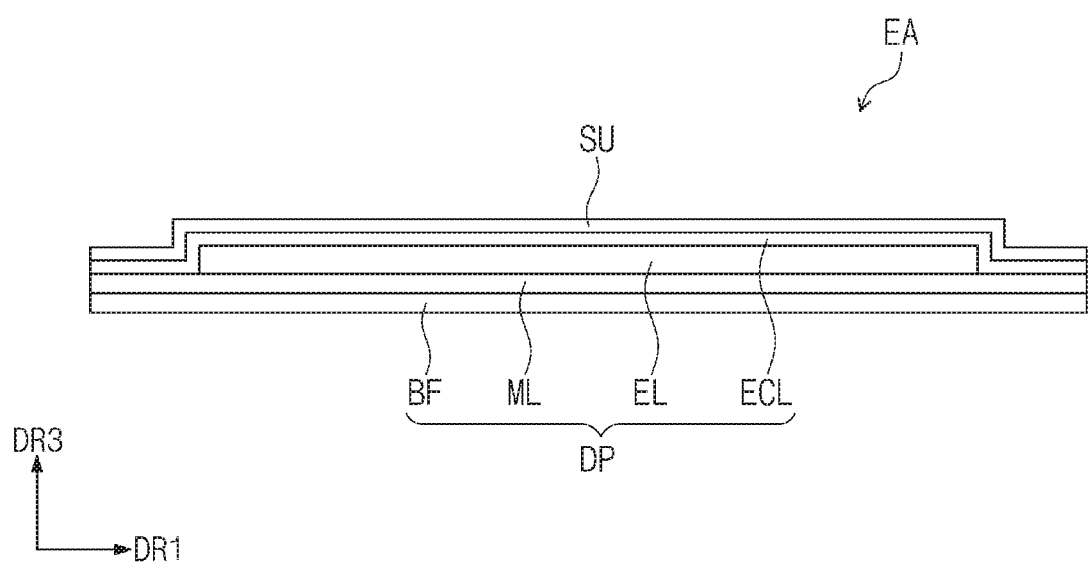
FIG. 2 is a schematic sectional view illustrating an electronic apparatus according to some embodiments of the inventive concept.

FIG. 1 is a perspective view illustrating an electronic apparatus according to some embodiments of the inventive concept, and FIG. 2 is a schematic sectional view illustrating an electronic apparatus according to some embodiments of the inventive concept.

Referring to FIGS. 1 and 2, an electronic apparatus EA may be a device configured to detect a touch event provided from the outside. In FIG. 1, a display device is illustrated as an example of the electronic apparatus EA. In this case, the electronic apparatus EA may include a display panel DP and an input sensor SU. However, the inventive concept is not limited to this example, and in certain embodiments, the display panel DP may be omitted from the electronic apparatus EA.

When viewed in a plan view perpendicular to a first direction DR1 and a second direction DR2, the electronic apparatus EA may include an active region AA and a peripheral region NAA. A thickness direction of the electronic apparatus EA will be referred to as a third direction DR3. A front or top surface and a rear or bottom surface of each member may be distinguished, based on the third direction DR3. However, directions indicated by the first to third directions DR1, DR2, and DR3 may be relative concepts, and in certain embodiments, they may be changed to indicate other directions.

The active region AA may be activated, when an electrical signal is supplied thereto. When using the electronic apparatus EA, the active region AA may be activated to perform various functions. For example, the active region AA may be used as a sensing region of sensing an external input event. As shown in FIG. 1, the electronic apparatus EA may be configured to sense an external input TC to be applied to the active region AA. That is, the electronic apparatus EA may act as an input device.

FIG. 1 illustrates an example in which a user's hand is used as the external input TC, but various external inputs may be used as the external input TC. For example, the external input TC may include various types of external inputs, such as a part of a user's body, a stylus pen, light, heat, or pressure. The external input TC may further include a non-touching-type event (e.g., a hovering event near the sensor SU), in addition to such a touching-type event. In some embodiments, the electronic apparatus EA may be configured to sense various types of touch events, but the inventive concept is not limited to a specific one.

In addition, the active region AA may be a display region, which is configured to display information. The electronic apparatus EA may display an image IM on the active region AA, and the image IM may be used to provide information to a user. In this sense, the electronic apparatus EA may be used as an output device.

The peripheral region NAA may be located adjacent to one of edge regions of the active region AA. For example, wiring lines for providing external signals to the active region AA or driving devices for driving the active region AA may be provided in the peripheral region NAA.

In the present embodiment, the peripheral region NAA is illustrated to have a frame shape surrounding the active region AA. However, the inventive concept is not limited thereto, and in certain embodiments, the peripheral region NAA may be omitted from the electronic apparatus EA. The shape of the peripheral region NAA may be variously changed, and the inventive concept is not limited to a specific shape of the peripheral region NAA.

The display panel DP may produce the image IM, based on image data input thereto. As shown in FIG. 1, the image IM may include application icons and a clock window.

An organic light emitting display panel, which is one example of the display panel DP, will be described with reference to FIG. 2. However, the inventive concept is not limited thereto, and the display panel DP may be a liquid crystal display panel, a plasma display panel, or an electrophoresis display panel.

The display panel DP may include a base film BF, a circuit layer ML, a luminescent device layer EL, and a thin encapsulation layer ECL.

The base film BF may be or include a plastic substrate, a glass substrate, a metal substrate, or a substrate made of an organic/inorganic composite material. The plastic substrate may include at least one of acrylic resins, methacryl resins, polyisoprene resins, vinyl resins, epoxy resins, urethane resins, cellulose resins, siloxane resins, polyimide resins, polyamide resins, or perylene resins.

The circuit layer ML may include a plurality of insulating layers, a plurality of conductive layers, and at least one semiconductor layer. The plurality of conductive layers in the circuit layer ML may constitute signal lines or a control circuit of a pixel.

The luminescent device layer EL may include a display element (e.g., organic light emitting diodes). However, the inventive concept is not limited thereto, and depending on types of the display panels DP, the luminescent device layer EL may be configured to include inorganic light-emitting diodes or organic-inorganic hybrid light-emitting diodes.

The thin encapsulation layer ECL may be configured to seal the luminescent device layer EL. The thin encapsulation layer ECL may include a plurality of inorganic layers and at least one organic layer interposed therebetween. The inorganic layers may protect the luminescent device layer EL from moisture and oxygen, and the organic layer may protect the luminescent device layer EL from foreign substances (e.g., dust particles).

In addition, the thin encapsulation layer ECL may further include a buffer layer. The buffer layer may be a layer most adjacent to the input sensor SU. The buffer layer may be an inorganic layer or an organic layer. The inorganic layer may include at least one of silicon nitride, silicon oxynitride, silicon oxide, titanium oxide, or aluminum oxide. The organic layer may include polymers (e.g., acrylic organic materials). However, the inventive concept is not limited thereto. The sensor SU may be directly provided on the display panel DP. In the present specification, the expression "be directly provided" is used to represent that two layers are successively formed one on top of the other, without formation of an additional adhesive layer. However, the inventive concept is not limited thereto, and the display panel DP and the input sensor SU may be coupled to each other by an adhesive member (not shown). The adhesive member may be formed of or include an organic adhesive layer (e.g., an optically clear adhesive (OCA) film, an optically clear resin (OCR) film, or a pressure sensitive adhesive (PSA) film). The organic adhesive layer may include adhesive materials, such as polyurethanes, polyacrylic, polyester, polyepoxy, and polyvinyl acetate materials.

Figure 3:
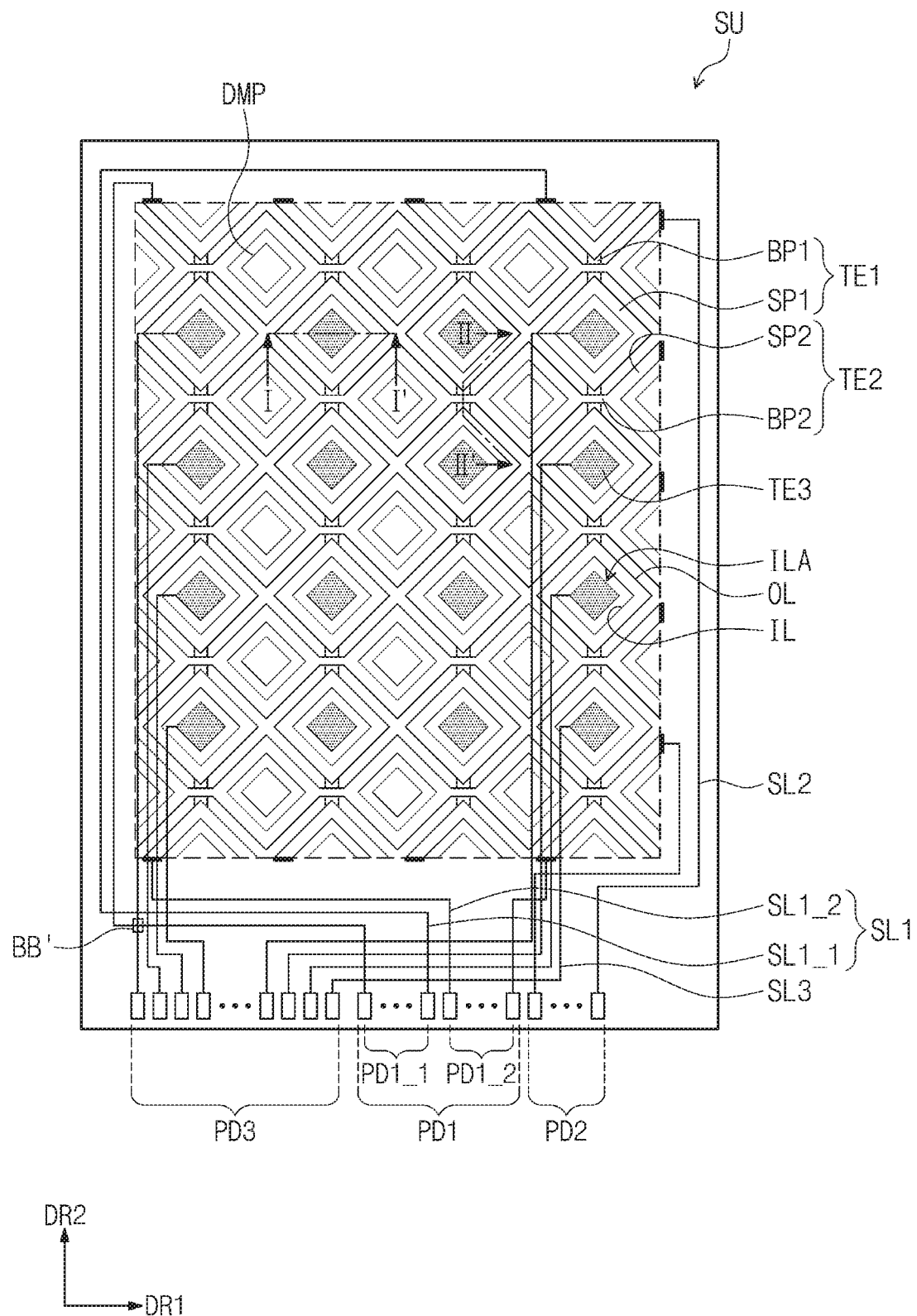
FIG. 3 is a schematic plan view illustrating an input sensor according to some embodiments of the inventive concept.

FIG. 3 is a schematic plan view illustrating an input sensor according to some embodiments of the inventive concept.

Referring to FIG. 3, the input sensor SU may include first sensor electrodes TE1, second sensor electrodes TE2, third sensor electrodes TE3, first wiring lines SL1, second wiring lines SL2, third wiring lines SL3, first pads PD1, second pads PD2, and third pads PD3.

The first sensor electrodes TE1 may be arranged in the first direction DR1. Each of the first sensor electrodes TE1 may include a plurality of first sensor patterns SP1, which are arranged in the second direction DR2, and first connection patterns BP1, which extend along the second direction DR2 and are configured to electrically connect adjacent ones of the first sensor patterns SP1 to each other.

The second sensor electrodes TE2 may be arranged in the second direction DR2. Each of the second sensor electrodes TE2 may include a plurality of second sensor patterns SP2, which are arranged in the first direction DR1, and second connection patterns BP2, which extend along the first direction DR1 and are configured to electrically connect adjacent ones of the second sensor patterns SP2 to each other.

The number of the first sensor electrodes TE1 may be the same as or different from that of the second sensor electrodes TE2. The numbers of the first sensor electrodes TE1 and the second sensor electrodes TE2 may be variously changed in consideration of a shape and an area of the active region AA (e.g., see FIG. 1).

Each of the first and second sensor patterns SP1 and SP2 may include an outer line OL and an inner line IL. When viewed in a plan view, the inner line IL may be defined within the outer line OL. When viewed in a plan view, the first and second sensor patterns SP1 and SP2 may not be provided in an internal region ILA delimited by the inner line IL.

The third sensor electrodes TE3 may be called as third sensor patterns, self-capacitance sensor patterns, or operation dummy patterns.

Each of the third sensor patterns TE3 may be disposed on the inner area ILA surrounded by the inner line IL of the first sensor patterns SP1 or the inner line IL of the second sensor patterns SP2, when viewed in a plan view. In one embodiment of the present inventive concept, one third sensor pattern TE3 may be disposed in one inner area ILA surrounded by one inner peripheral line IL. The third sensor patterns TE3 may be electrically disconnected from the first and second sensor patterns SP1 and SP2.

In FIG. 3, the third sensor patterns TE3 may be provided in the internal regions ILA of some of the first and second sensor patterns SP1 and SP2. In this case, dummy patterns DMP may be provided in the internal regions ILA of the others of the first and second sensor patterns SP1 and SP2, in which the third sensor patterns TE3 are not provided. The third sensor patterns TE3 is not overlapped with the dummy pattern DMP. In FIG. 3, the regions for the third sensor patterns TE3 are illustrated with a dotted pattern to allow them to be distinguished from regions for the dummy patterns DMP. The dummy pattern DMP may be floating electrodes, to which an additional electrical signal from the outside is not applied. Thus, it may be possible to omit additional signal lines connected to the dummy pattern DMP. The dummy patterns DMP may be electrically disconnected from the first sensor patterns SP1, the second sensor patterns SP2, and the third sensor patterns TE3.

A variation in mutual-capacitance between the first and second sensor patterns SP1 and SP2 may be used to sense a touch event from the outside. In certain embodiments, each of the third sensor patterns TE3 may be configured to sense an external touch event through a variation in self-capacitance thereof.

The first and second sensor patterns SP1 and SP2 may be advantageous for multi-touch sensing, whereas the third sensor patterns TE3 may be advantageous for indirect-touch sensing (e.g., sensing a touch in a space or a hovering), low noise, and high sensitivity. In some embodiments, the input sensor SU may sense touch events using both of the mutual-capacitance and self-capacitance sensing methods.

Each of the first sensor patterns SP1, the second sensor patterns SP2, the third sensor patterns TE3, the first connection patterns BP1, and the second connection patterns BP2 may be formed of or include a transparent conductive oxide. For example, each of the first sensor patterns SP1, the second sensor patterns SP2, the third sensor patterns TE3, the first connection patterns BP1, and the second connection patterns BP2 may be formed of or include at least one of indium zinc oxide (IZO), indium tin oxide (ITO), indium gallium oxide (IGO), indium zinc gallium oxide (IGZO), or mixtures/compounds thereof. However, the inventive concept is not limited thereto.

The first wiring lines SL1 may be connected to the first sensor electrodes TE1, the second wiring lines SL2 may be connected to the second sensor electrodes TE2, and the third wiring lines SL3 may be connected to the third sensor electrodes TE3.

The first wiring lines SL1 may be respectively connected to the first sensor patterns SP1, which are provided at end portions of each of the first sensor electrodes TE1. In detail, one end portions of the first sensor electrodes TE1 may be respectively connected to first pads PD1_1 through first wiring lines SL1_1, and other end portions of the first sensor electrodes TE1 may be respectively connected to first pads PD1_2 through first wiring lines SL1_2. In other words, since a plurality of wiring lines are connected to a single sensor electrode, it may be possible to improve technical issues, such as a spatial variation in voltage drop of an electrical signal and the consequent deterioration in sensitivity.

The second wiring lines SL2 may be respectively connected to the second sensor patterns SP2, which are provided at end portions of each of the second sensor electrodes TE2, and the third wiring lines SL3 may be connected to the third sensor electrodes TE3 in a one-to-one corresponding manner.

However, the inventive concept is not limited thereto. For example, a plurality of wiring lines may be connected to each of the second sensor electrodes TE2, similar to the first sensor electrodes TE1. In certain embodiments, the wiring lines may be connected to one side end of each of the first sensor electrodes TE1. In the electronic apparatus according to some embodiments of the inventive concept, the sensor electrodes may be connected to the signal lines in various manners, and the inventive concept is not limited to a specific connection structure between the sensor electrodes and the signal lines.

Each of the first wiring lines SL1, the second wiring lines SL2, and the third wiring lines SL3 may have a single-layered or multi-layered structure. Also, each of the first wiring lines SL1, the second wiring lines SL2, and the third wiring lines SL3 may be formed of or include at least one of transparent conductive oxide materials including indium zinc oxide (IZO), indium tin oxide (ITO), indium gallium oxide (IGO), indium zinc gallium oxide (IGZO), or mixtures/compounds thereof and may include at least one of molybdenum, silver, titanium, copper, aluminum, or alloys thereof.

The first pads PD1 may be connected to the first wiring lines SL1, respectively, the second pads PD2 may be connected to the second wiring lines SL2, respectively, and the third pads PD3 may be connected to the third wiring lines SL3, respectively. The first pads PD1, the second pads PD2, and the third pads PD3 may be electrically connected to a driving part, which is provided outside the input sensor SU. The driving part may transmit or receive electrical signals to or from the input sensor SU through the first pads PD1, the second pads PD2, and the third pads PD3. The electrical signals may include driving and power signals to be applied to the input sensor SU and sensing signals to be received from the input sensor SU.

The first pads PD1, the second pads PD2, and the third pads PD3 are illustrated to be arranged in a line parallel to the first direction DR1, but in certain embodiments, the first pads PD1, the second pads PD2, and the third pads PD3 may be alternately arranged or may be partly separated from the others. That is, the arrangement of the first pads PD1, the second pads PD2, and the third pads PD3 may be variously changed.

Figure 4:
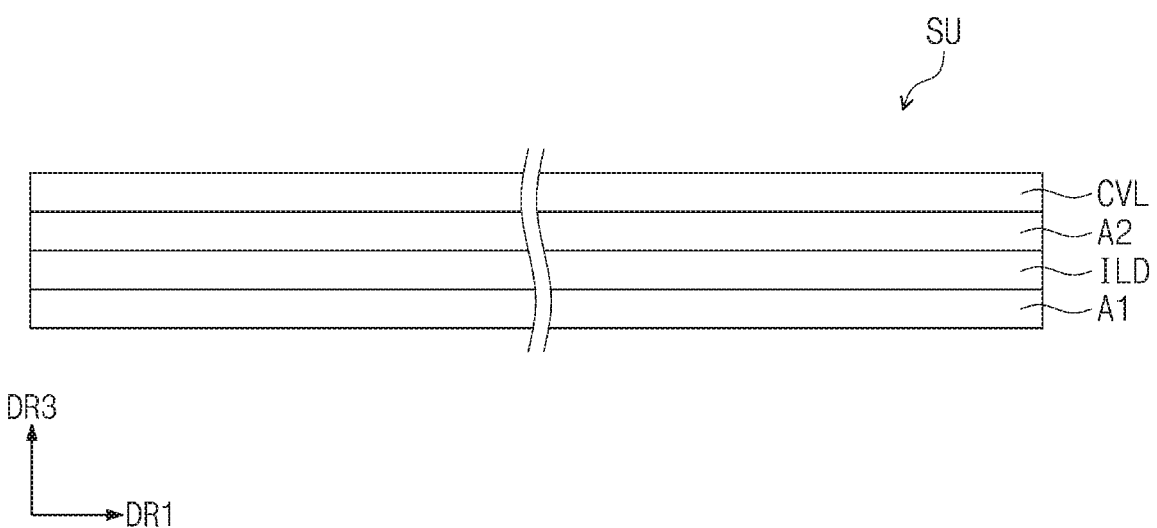
FIG. 4 is a sectional view illustrating an input sensor according to some embodiments of the inventive concept.

FIG. 4 is a sectional view illustrating an input sensor according to some embodiments of the inventive concept.

Referring to FIGS. 3 and 4, the input sensor SU may include a first conductive layer A1, an insulating layer ILD, a second conductive layer A2, and a cover layer CVL.

Each of the first and second conductive layers A1 and A2 may include a plurality of conductive patterns. The conductive patterns may be used as the first sensor electrodes TE1, the second sensor electrodes TE2, the third sensor electrodes TE3, the first wiring lines SL1, the second wiring lines SL2, the third wiring lines SL3, the first pads PD1, the second pads PD2, or the third pads PD3 described with reference to FIG. 3. This will be described in more detail below.

The insulating layer ILD may be provided between the first and second conductive layers A1 and A2. The insulating layer ILD may separate the first and second conductive layers A1 and A2 from each other, when viewed in a sectional view. In other words, the first and second conductive layers A1 and A2 may be electrically insulated from each other by the insulating layer ILD. In certain embodiments, the first and second conductive layers A1 and A2 may be electrically coupled to each other through contact holes formed in the insulating layer ILD. The insulating layer ILD may be formed of or include an organic material and/or an inorganic material.

The cover layer CVL may be provided to cover and protect the second conductive layer A2. The cover layer CVL may be formed of or include a material having an insulating property. The cover layer CVL may include at least one inorganic layer and/or at least one organic layer. In certain embodiments, the cover layer CVL may be omitted.

Figure 5:
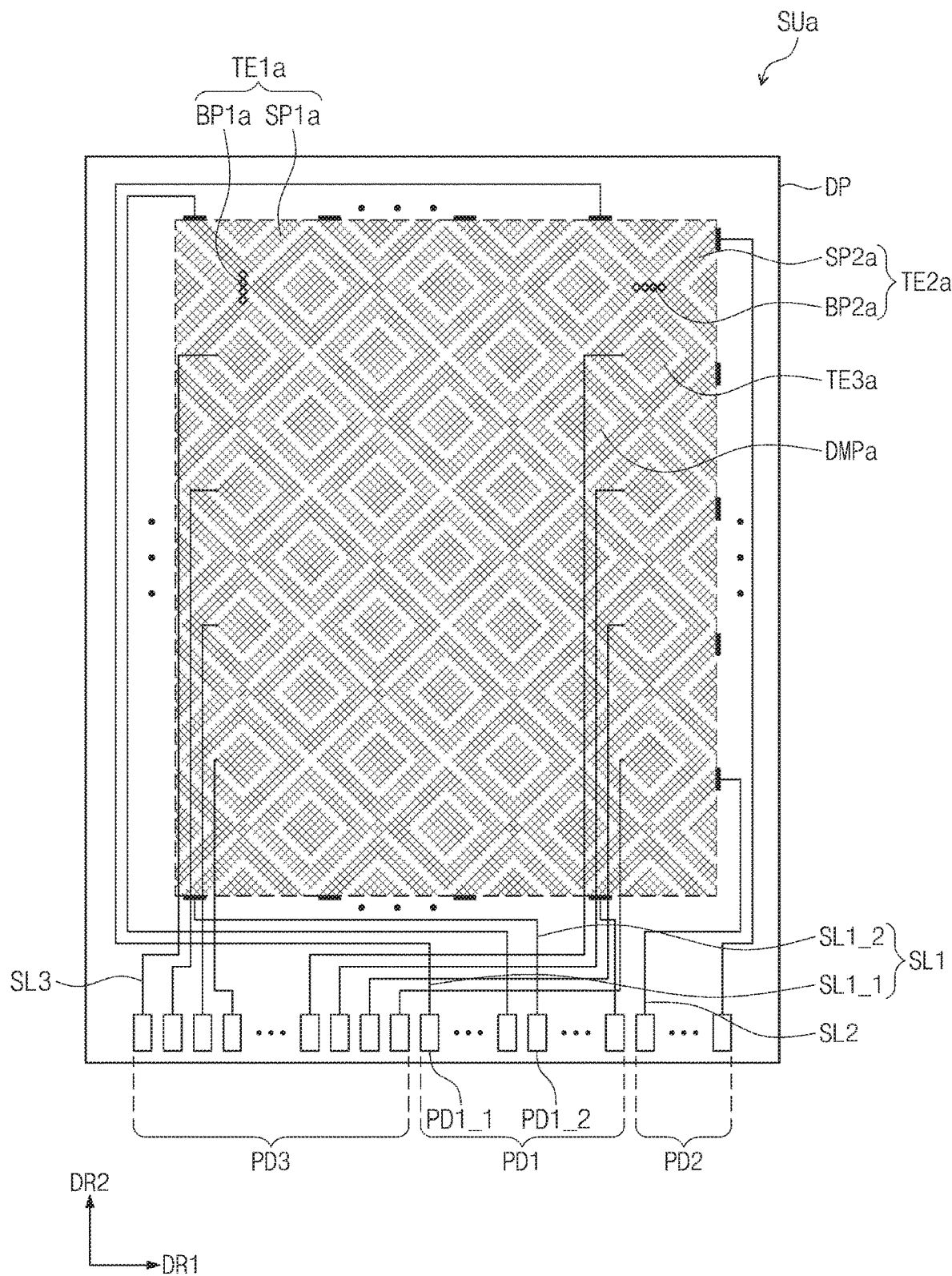
FIG. 5 is a schematic plan view illustrating an input sensor according to some embodiments of the inventive concept.

FIG. 5 is a schematic plan view illustrating an input sensor SUa according to some embodiments of the inventive concept. In the following description of FIG. 5, an element previously described with reference to FIG. 3 may be identified by a similar or identical reference number without repeating an overlapping description thereof, for the sake of brevity.

Referring to FIG. 5, first sensor patterns SP1a and first connection patterns BP1a of first sensor electrodes TE1a, second sensor patterns SP2a and second connection patterns BP2a of second sensor electrodes TE2a, third sensor patterns TE3a, and dummy patterns DMPa may be formed of or include at least one of metallic materials (e.g., molybdenum, silver, titanium, copper, aluminum, or alloys thereof).

In the case where each of the patterns includes a metal layer, the metal layer may be provided to have a metal mesh structure. Thus, even if the patterns are formed of an opaque material, it may be possible to suppress or prevent the patterns from being recognized by a user.

FIG. 5 illustrates an example in which the first connection patterns BP1a and the second connection patterns BP2a are formed to have a metal mesh structure, but the inventive concept is not limited thereto. For example, the first connection patterns BP1a and the second connection patterns BP2a may be provided to have a line-shape structure having a specific width, not the metal mesh structure.

Figure 6A:
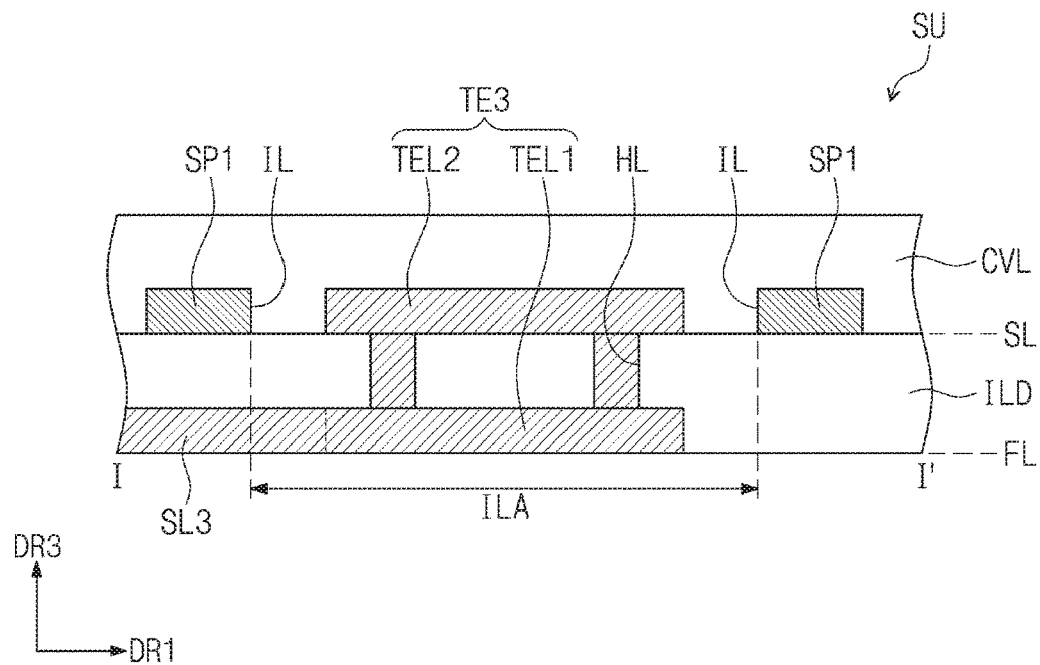
FIG. 6A is a sectional view taken along line I-I' of FIG. 3.
Figure 6B:
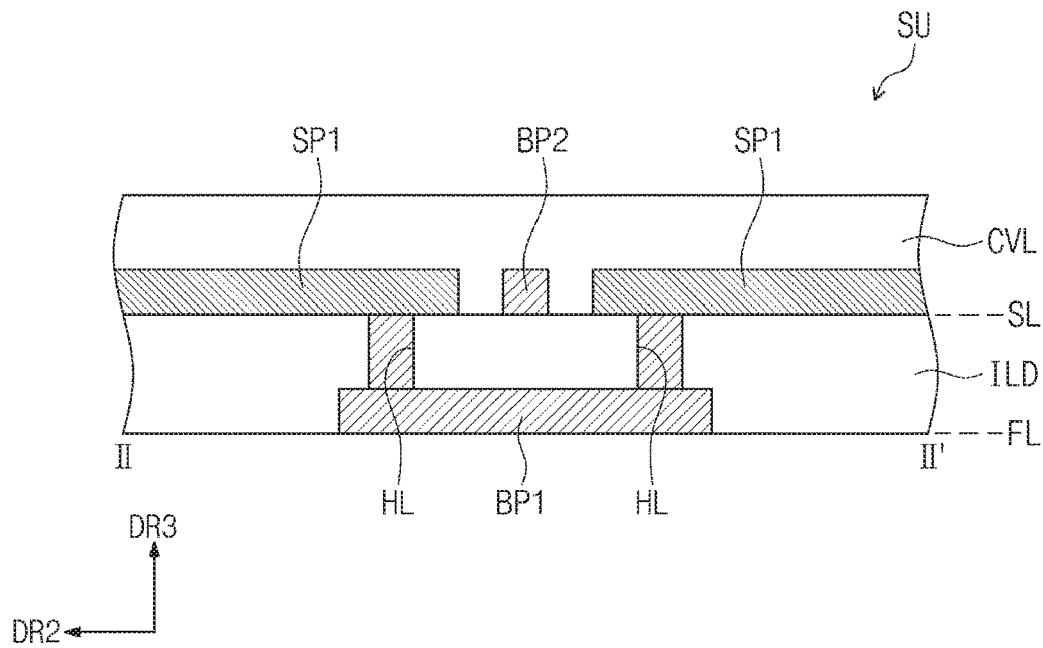
FIG. 6B is a sectional view taken along line II-II' of FIG. 3.

FIG. 6A is a sectional view taken along line I-I' of FIG. 3, FIG. 6B is a sectional view taken along line II-II' of FIG.

Figure 7A:
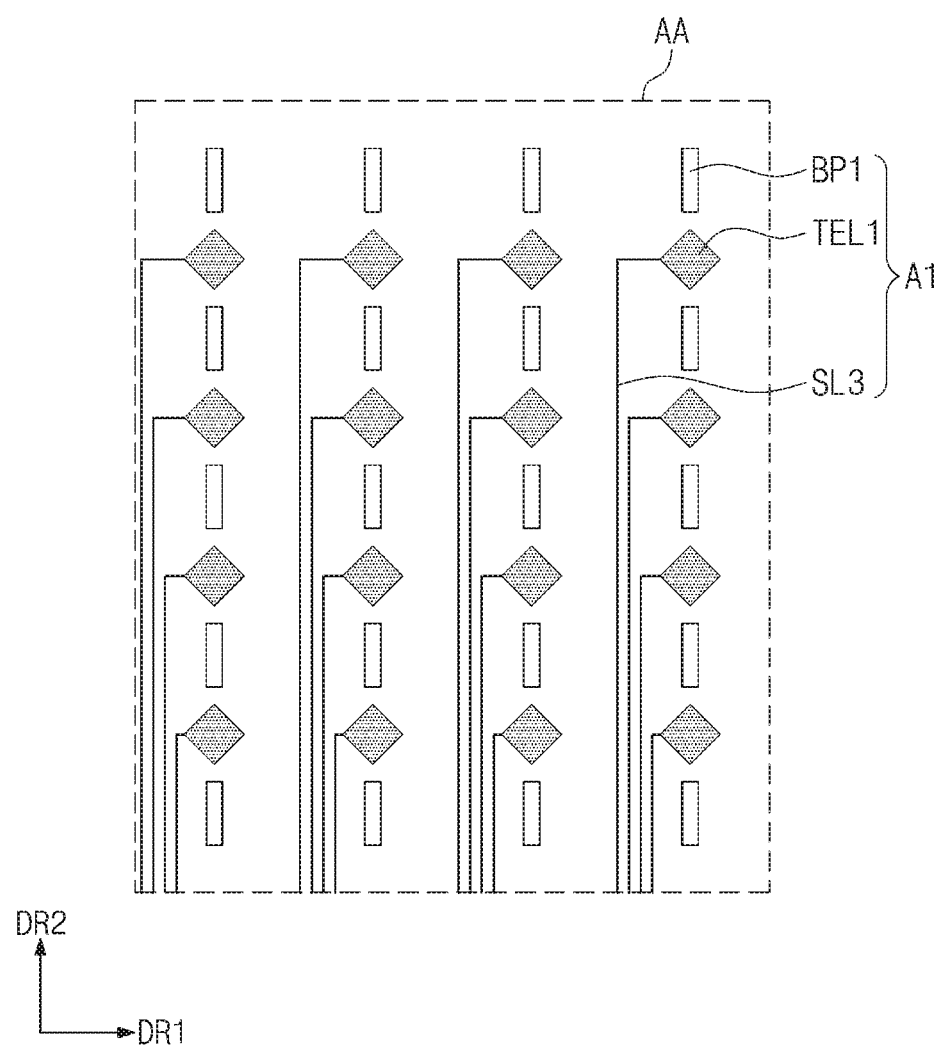
FIG. 7A is a plan view illustrating a portion of an input sensor according to some embodiments of the inventive concept.
Figure 7B:
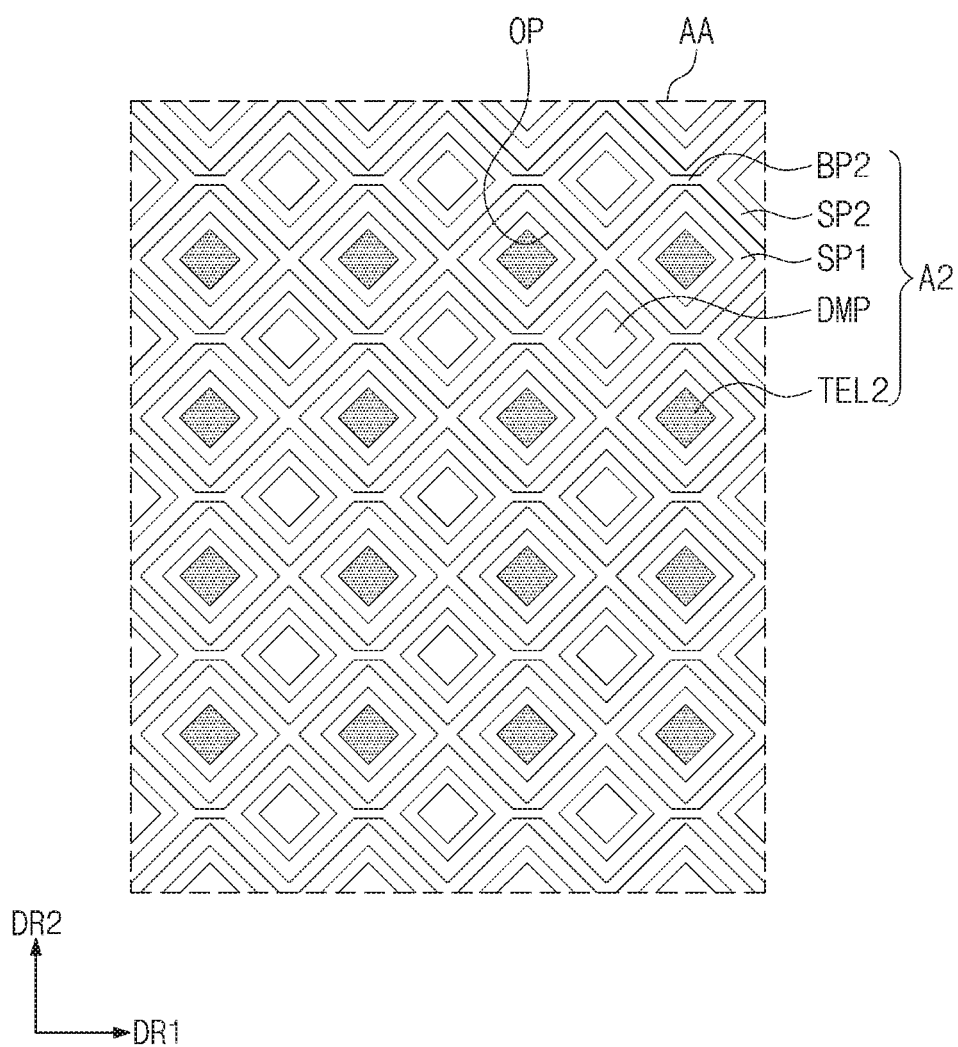
FIG. 7B is a plan view illustrating a portion of an input sensor according to some embodiments of the inventive concept.

3, and each of FIGS. 7A and 7B is a plan view illustrating a portion of an input sensor according to some embodiments of the inventive concept.

In detail, each of FIGS. 7A and 7B illustrates a portion of the input sensor corresponding to the active region AA. In more detail, FIG. 7A illustrates patterns in the first conductive layer A1, and FIG. 7B illustrates patterns in the second conductive layer A2.

Referring to FIG. 6A, the third sensor pattern TE3 may include a first sub-sensor pattern TEL1 located at a first level FL and a second sub-sensor pattern TEL2 located at a second level SL. The first sub-sensor pattern TEL1 may be electrically connected to the third wiring line SL3.

Here, the first level FL may be the same level as a top surface of the thin encapsulation layer ECL (e.g., see FIG. 2), and the second level SL may be the same level as a top surface of the insulating layer ILD. In other words, the insulating layer ILD may be provided between the first and second levels FL and SL. The first sub-sensor pattern TEL1 and the second sub-sensor pattern TEL2 may be electrically connected to each other through a contact hole HL formed in the insulating layer ILD.

Referring to FIG. 6B, the first connection pattern BP1 and the second connection pattern BP2 may be located at different levels. For example, the first connection pattern BP1 may be located at the first level FL, and the second connection pattern BP2 may be located at the second level SL. The first connection pattern BP1 and the second connection pattern BP2 may be electrically insulated from each other by the insulating layer ILD.

The first connection pattern BP1 may electrically connect two adjacent first sensor patterns SP1 through the contact holes HL formed in the insulating layer ILD. FIG. 6B illustrates an example in which the first connection pattern BP1 and the second connection pattern BP2 are respectively located at the first and second levels FL and SL, but in certain embodiments, the second connection pattern BP2 may be located at the first level FL and the first connection pattern BP1 may be located at the second level SL. In this case, the second connection pattern BP2 may be electrically connects two adjacent second sensor patterns SP2 (e.g., see FIG. 3) through contact holes formed in the insulating layer ILD.

Referring to FIGS. 7A and 7B, the first conductive layer A1 may include the first connection pattern BP1, the first sub-sensor pattern TEL1, and the third wiring lines SL3.

In some embodiments, the first sub-sensor pattern TEL1 and the third wiring lines SL3 may be formed to be spaced apart from the first connection pattern BP1. Thus, an existing layer may be easily used to realize a structure (e.g., the first sub-sensor pattern TEL1 and the third wiring lines SL3) for sensing a touch event using a self-capacitance sensing method. For example, the first sub-sensor pattern TEL1 and the third wiring lines SL3 may be formed using the same process as that for forming the first connection pattern BP1. Furthermore, since the third wiring lines SL3 are provided in the active region AA, expansion of the peripheral region NAA of FIG. 1, even though the third sensor pattern TE3 and the third wiring lines SL3 are added, may not be required.

The second conductive layer A2 may include the second connection pattern BP2, the first sensor pattern SP1, the second sensor pattern SP2, the second sub-sensor pattern TEL2, and the dummy pattern DMP.

An opening OP may be defined in each of the first and second sensor patterns SP1 and SP2. The opening OP may correspond to the internal region ILA of FIG. 6A described above.

The second sub-sensor pattern TEL2 or the dummy pattern DMP may be provided in each of the openings OP. For example, the second sub-sensor pattern TEL2 may be patterns, which are provided in the opening OP and are electrically connected to the third wiring lines SL3 previously described with reference to FIG. 7A, and the dummy pattern DMP may be patterns, which are provided in the opening OP and are not electrically connected to the third wiring lines SL3. In FIG. 7B, in order to distinguish the second sub-sensor pattern TEL2 from the dummy pattern DMP, the second sub-sensor pattern TEL2 is illustrated by a dotted pattern.

The structure of the input sensor SU described with reference to FIGS. 6A, 6B, 7A, and 7B may also be applied to the input sensor SUa shown in FIG. 5.

Figure 8A:
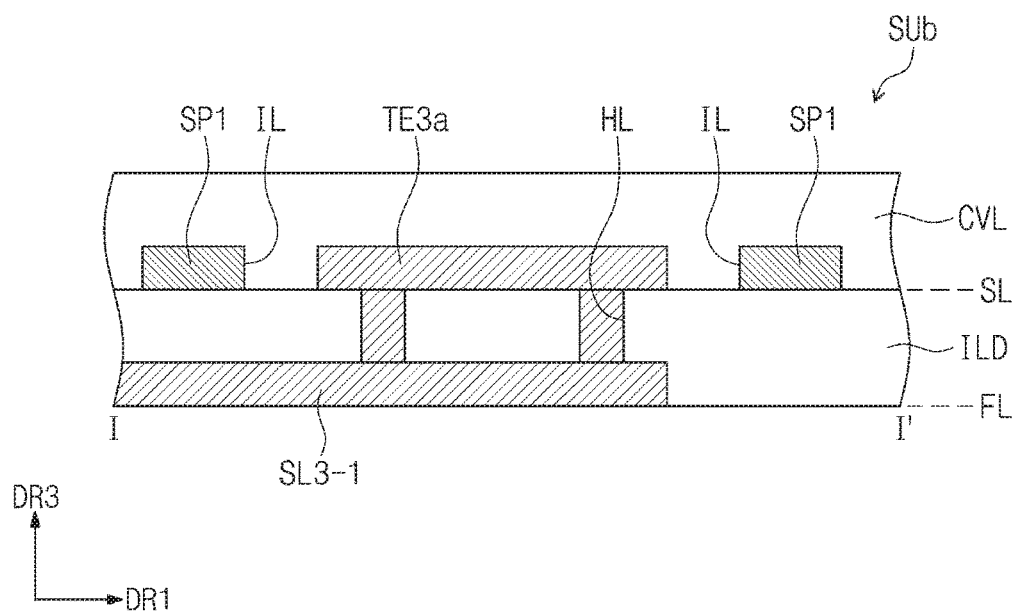
FIG. 8A is a sectional view corresponding to the line I-I' of FIG. 3.
Figure 8B:
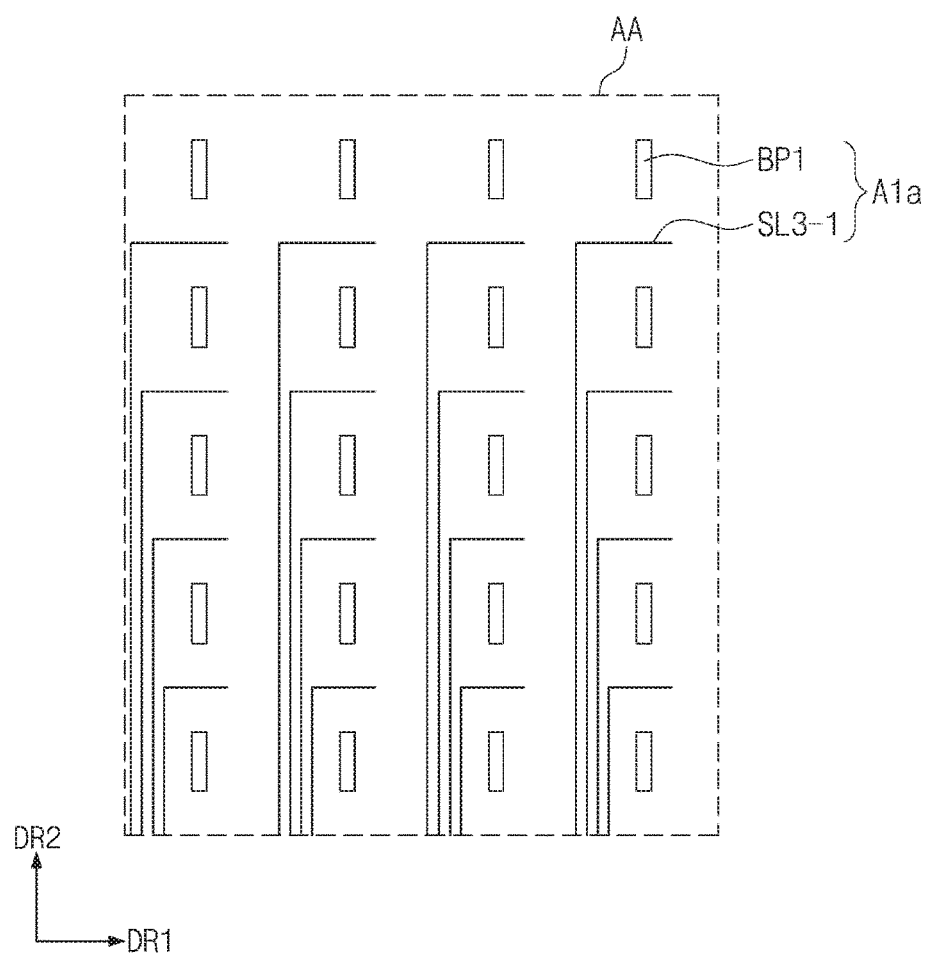
FIG. 8B is a plan view illustrating a portion of an input sensor according to some embodiments of the inventive concept.

FIG. 8A is a sectional view corresponding to the line I-I' of FIG. 3, and FIG. 8B is a plan view illustrating a portion of an input sensor according to some embodiments of the inventive concept. Patterns shown in FIG. 8B may be patterns included in a first conductive layer A1a.

Referring to FIGS. 8A and 8B, an input sensor SUb may include the third sensor patterns TE3a, each of which is located at the second level SL and is connected to a third wiring line SL3-1 through the contact hole HL formed in the insulating layer ILD. For example, the first conductive layer A1a may include the third wiring lines SL3-1 and the first connection pattern BP1. In the case where the input sensor Sub has the layer structure of FIG. 8A, the second conductive layer may be provided to have the same features as those of the second conductive layer A2 of FIG. 7B. Thus, the second conductive layer is not illustrated. The third sensor patterns TE3a connected to the third wiring lines SL3-1 may be used to sense an external touch event from a change in self-capacitance. In addition, patterns, which are not connected to the third wiring lines SL3-1, may be used as dummy patterns, and in certain embodiments, they may be floating electrodes, to which an additional electrical signal from the outside is not applied.

The structure of the input sensor Sub described with reference to FIGS. 8A and 8B may be applied to the input sensor SUa shown in FIG. 5.

Figure 9A:
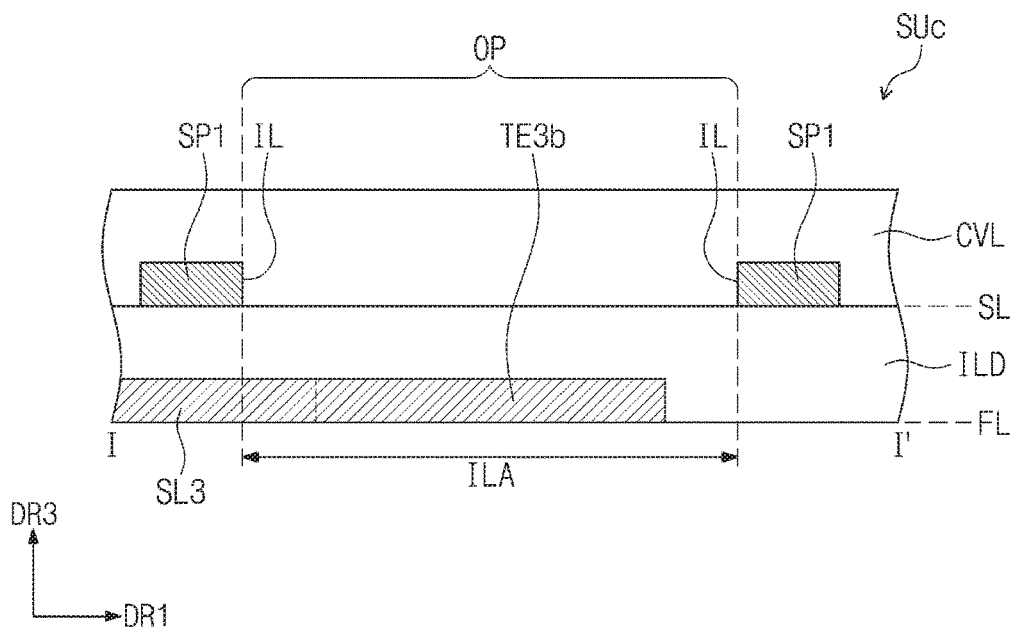
FIG. 9A is a sectional view corresponding to the line I-I' of FIG. 3.
Figure 9B:
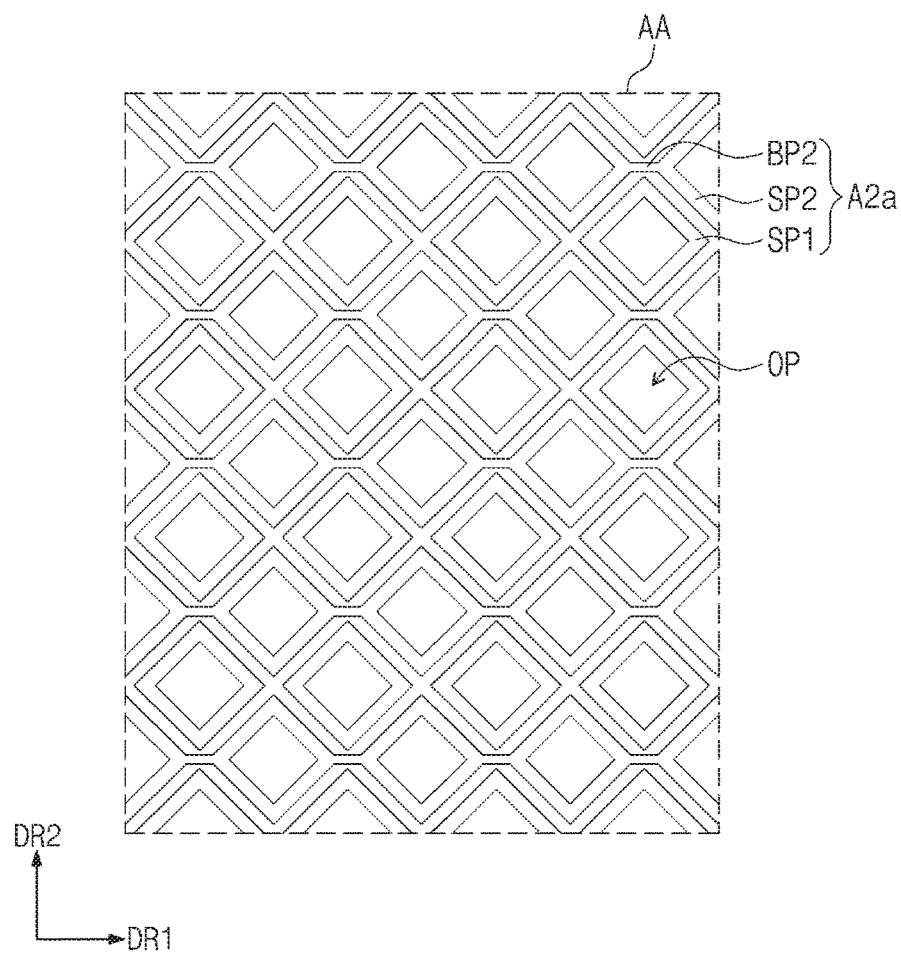
FIG. 9B is a plan view illustrating a portion of an input sensor according to some embodiments of the inventive concept.

FIG. 9A is a sectional view corresponding to the line I-I' of FIG. 3, and FIG. 9B is a plan view illustrating a portion of an input sensor according to some embodiments of the inventive concept. Patterns shown in FIG. 9B may be patterns included in a second conductive layer A2a.

Referring to FIGS. 9A and 9B, a second conductive layer A2a of an input sensor SUc may include the first and second sensor patterns SP1 and SP2, each of which is provided to have the opening OP, and the second connection patterns BP2. In other words, the second conductive layer A2a may not include the third sensor patterns.

Each of third sensor patterns TE3b may be provided in the first level FL. For example, the third sensor patterns TE3b may be provided at a region overlapped with the opening OP, when viewed in a plan view. In the case where the input sensor SUc has the same layer structure as that of FIG. 9A, the first conductive layer may be the same as the first conductive layer A1 of FIG. 7A. Thus, the first conductive layer is not illustrated.

The structure of the input sensor SUc described with reference to FIGS. 9A and 9B may be applied to the input sensor SUa shown in FIG. 5.

Figure 10:
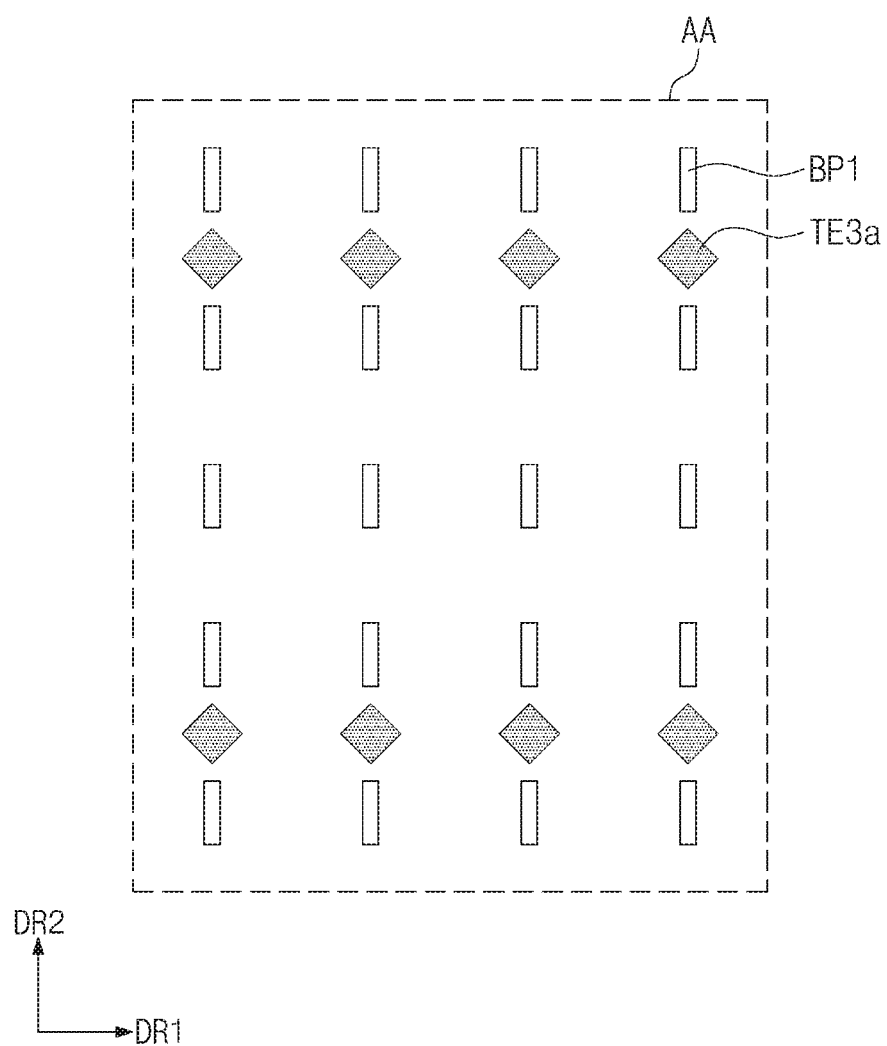
FIG. 10 is a plan view illustrating a portion of an input sensor according to some embodiments of the inventive concept.
Figure 11:
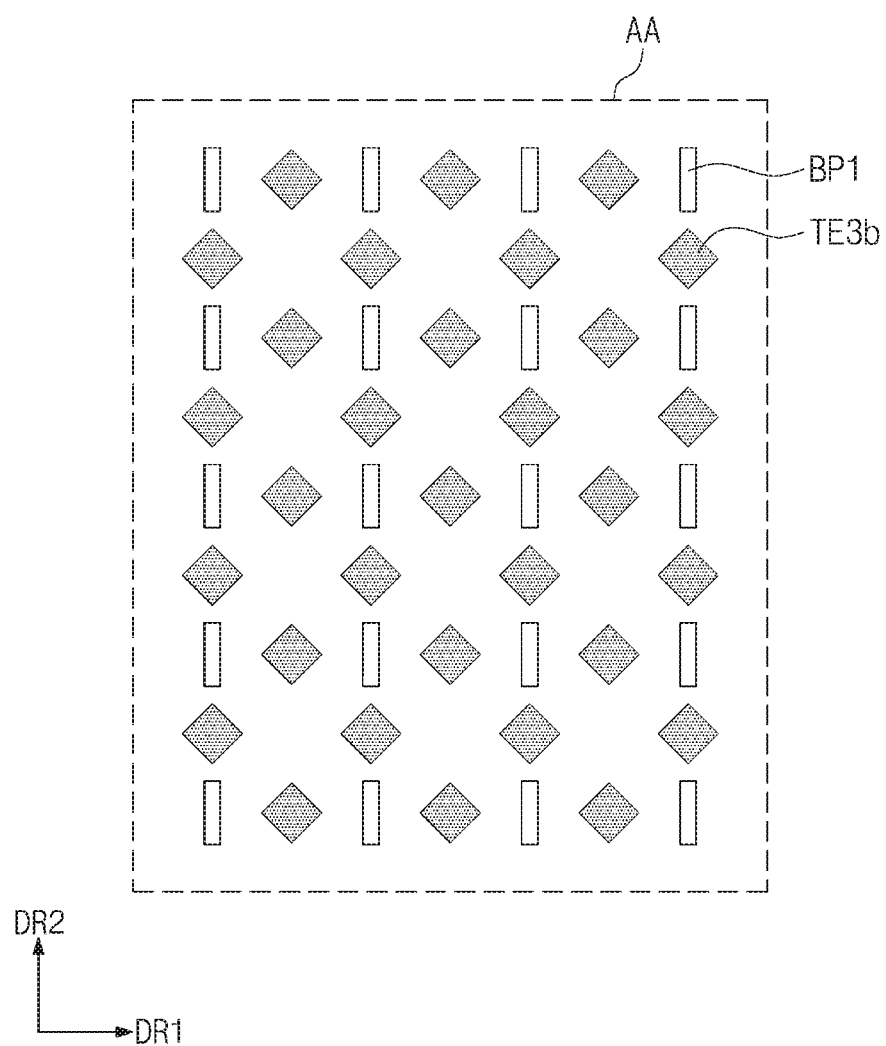
FIG. 11 is a plan view illustrating a portion of an input sensor according to some embodiments of the inventive concept.

FIG. 10 is a plan view illustrating a portion of an input sensor according to some embodiments of the inventive concept, and FIG. 11 is a plan view illustrating a portion of an input sensor according to some embodiments of the inventive concept. In order to reduce complexity in the drawings and to provide better understanding of the inventive concept, only the first connection patterns BP1 and the third sensor patterns TE3a and TE3b are illustrated in each of FIGS. 10 and 11.

FIG. 10 illustrates an example in which eight third sensor patterns TE3a are provided. That is, the number of the third sensor patterns TE3a may be reduced to half that (i.e., 16) of the previous example of FIG. 7A.

Referring to FIG. 11, the number of the third sensor patterns TE3b may be 31, which is about two times the number (i.e., 16) of the previous example of FIG. 7A.

The number, density, or arrangement positions of the third sensor patterns TE3a and TE3b may be variously changed. For example, the third sensor patterns TE3a and TE3b may be locally arranged on only an upper, lower, or outermost region of the active region AA or may be uniformly arranged on the entire region.

Figure 12:
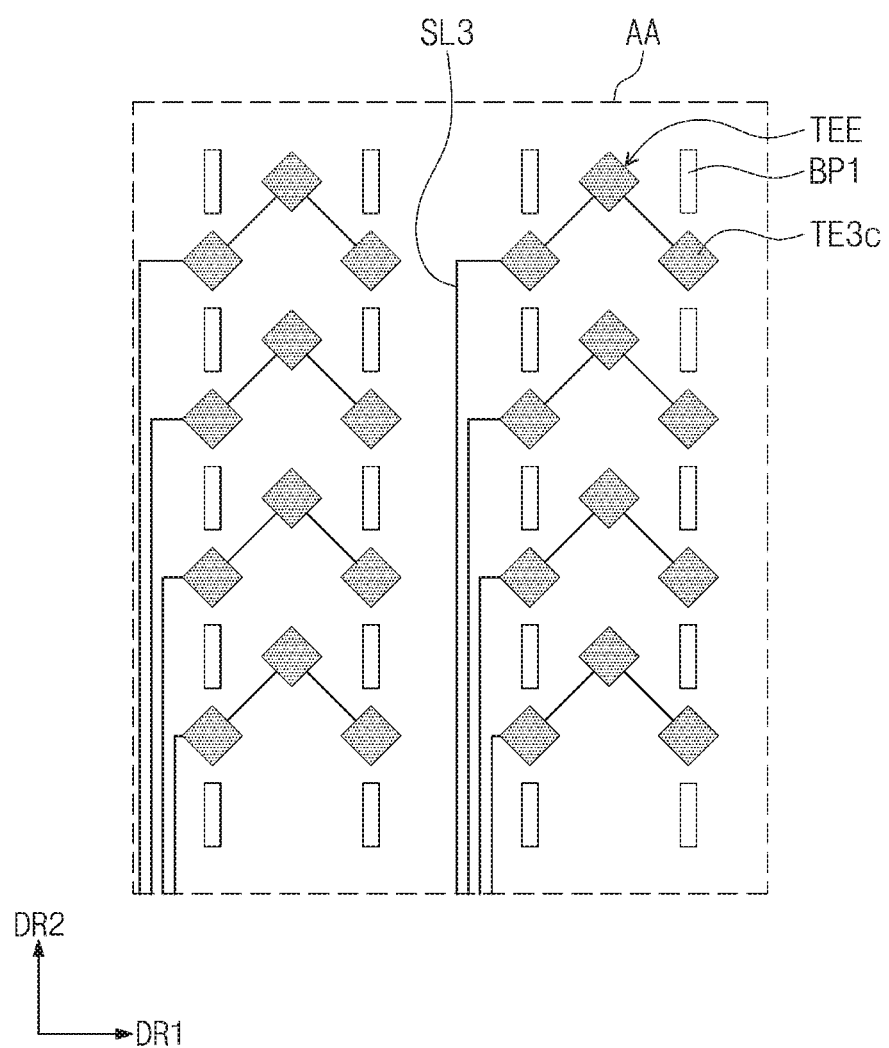
FIG. 12 is a plan view illustrating a portion of an input sensor according to some embodiments of the inventive concept.

FIG. 12 is a plan view illustrating a portion of an input sensor according to some embodiments of the inventive concept.

Referring to FIG. 12, two or more third sensor patterns TE3c may be electrically connected to each other, thereby forming a single sensor electrode TEE. Each of the third wiring lines SL3 may be electrically connected to a corresponding one of the sensor electrodes TEE.

FIG. 12 illustrates an example of the sensor electrode TEE, which includes three third sensor patterns TE3c connected to each other, but the number of the third sensor patterns TE3c constituting each of the sensor electrodes TEE is not limited thereto. For example, the sensor electrode TEE may include a pair of the third sensor patterns TE3c arranged in the first direction DR1. The number of the third sensor patterns TE3c constituting the sensor electrode TEE may be variously changed, in consideration of touch sensitivity.

The structure of the third sensor patterns TE3c described with reference to FIG. 12 may be applied to the input sensor SUa shown in FIG. 5.

Figure 13:
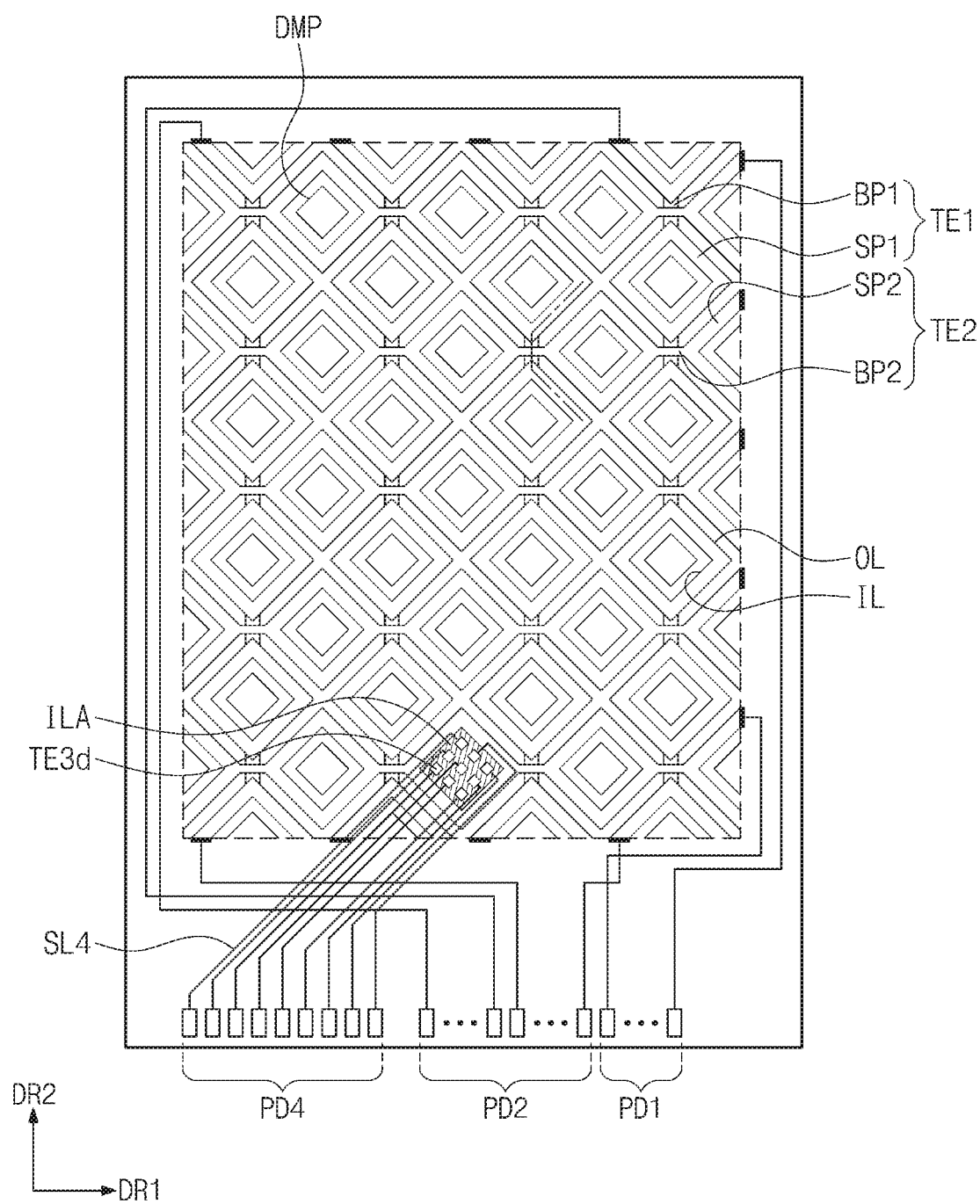
FIG. 13 is a plan view illustrating a portion of an input sensor according to some embodiments of the inventive concept.

FIG. 13 is a plan view illustrating a portion of an input sensor according to some embodiments of the inventive concept.

Referring to FIG. 13, a plurality of third sensor patterns TE3d may be provided in the internal region ILA of one of the first and second sensor patterns SP1 and SP2. The third sensor patterns TE3d, which are compactly provided in one internal region ILA, may be used to recognize biometric data such as a user's fingerprint. The third sensor patterns TE3d may be electrically connected to fourth pads PD4 through fourth wiring lines SL4.

FIG. 13 illustrates an example in which nine third sensor patterns TE3d are provided in one internal region ILA. However, the inventive concept is not limited thereto. The number of the third sensor patterns TE3d provided in one internal region ILA may be variously changed. In addition, FIG. 13 illustrates an example in which the third sensor patterns TE3d are provided in only one internal region ILA, but in certain embodiments, a plurality of the third sensor patterns TE3d may be provided in each of one or more (e.g., three) internal regions ILA.

The third sensor patterns TE3d described with reference to FIG. 13 may be additionally provided in the input sensors described above. For example, as shown in FIG. 13, a plurality of the third sensor patterns TE3d may be provided in at least one of the internal regions ILA, and a third sensor pattern may be provided in others of the internal regions ILA in a one-to-one corresponding manner.

Figure 14A:
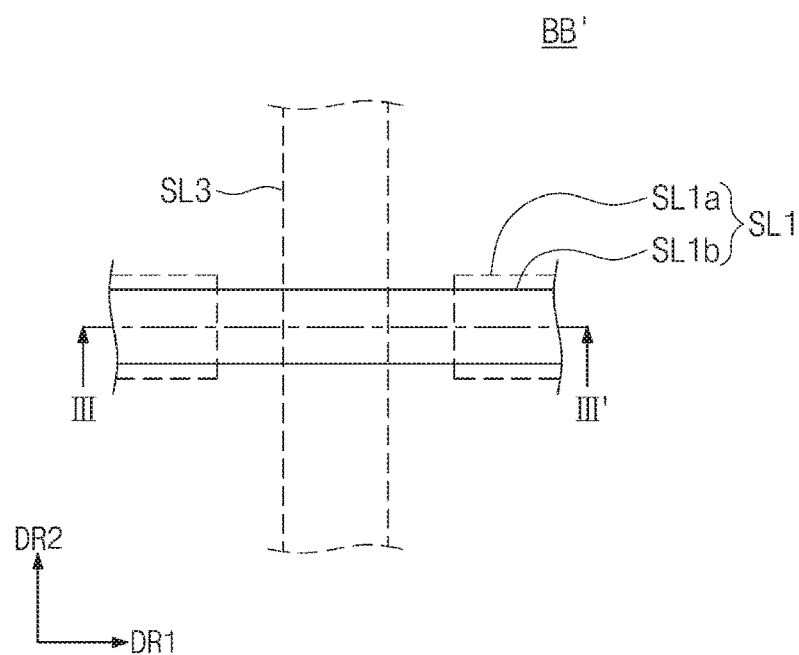
FIG. 14A is an enlarge plan view illustrating a portion of the input sensor of FIG. 3.
Figure 14B:
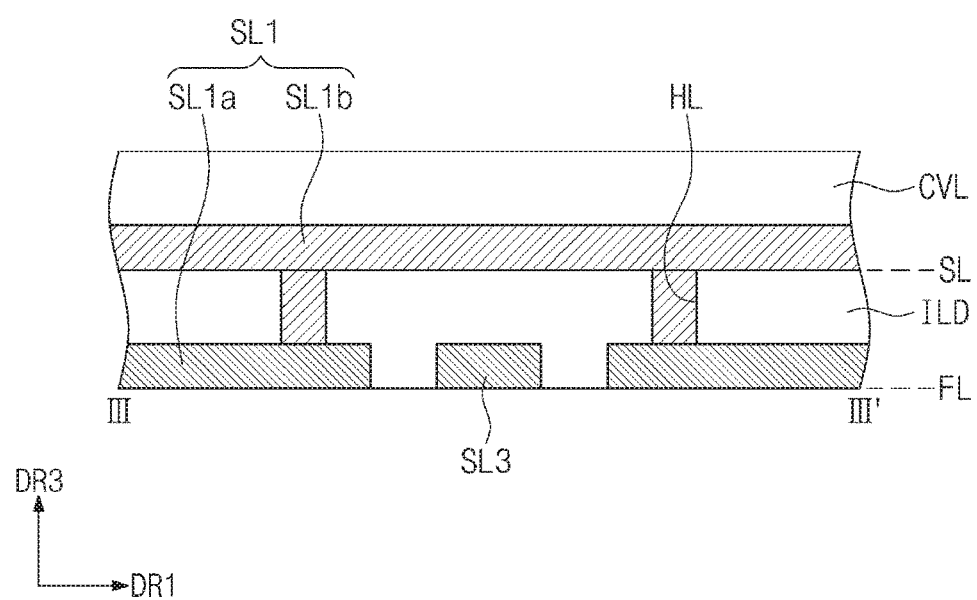
FIG. 14B is a sectional view corresponding to the line III-III' of FIG. 14A.

FIG. 14A is an enlarge plan view illustrating a portion BB' of the input sensor SU of FIG. 3, and FIG. 14B is a sectional view corresponding to the line III-III' of FIG. 14A.

In FIG. 14A, to reduce complexity in the drawings and to provide better understanding of the inventive concept, elements at the first level FL are illustrated by a dotted line and elements at the second level SL are illustrated in a solid line.

The third wiring line SL3 may be provided at the first level FL and may have a single-layered structure. The first wiring line SL1 may have a multi-layered structure including a first sub-wiring line SL1a and a second sub-wiring line SL1b, which are provided at the first and second levels FL and SL, respectively. The first sub-wiring line SL1a and the second sub-wiring line SL1b may be connected to each other via a contact hole HL formed in the insulating layer ILD. In addition, although not shown, the second wiring line SL2 (e.g., see FIG. 3) may be provided to have substantially the same layer structure as that of the first wiring line SL1.

In a region where the first sub-wiring line SL1a crosses the third wiring line SL3 at the first level FL, the first sub-wiring line SL1a may have a cut shape. The cut portions of the first sub-wiring line SL1a may be electrically connected to each other by the second sub-wiring line SL1b provided at the second level SL.

Figure 15A:
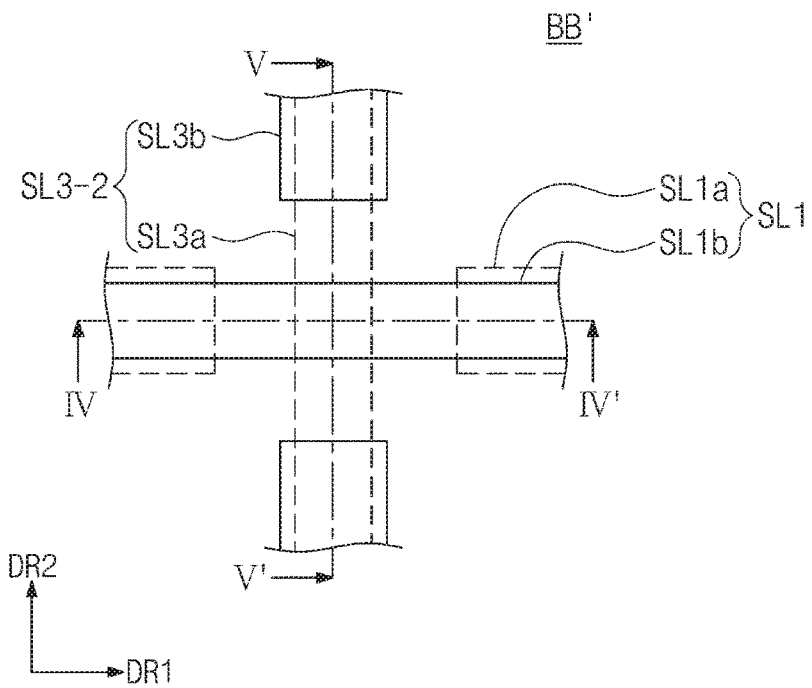
FIG. 15A is an enlarge plan view illustrating a portion of the input sensor of FIG. 3.
Figure 15B:
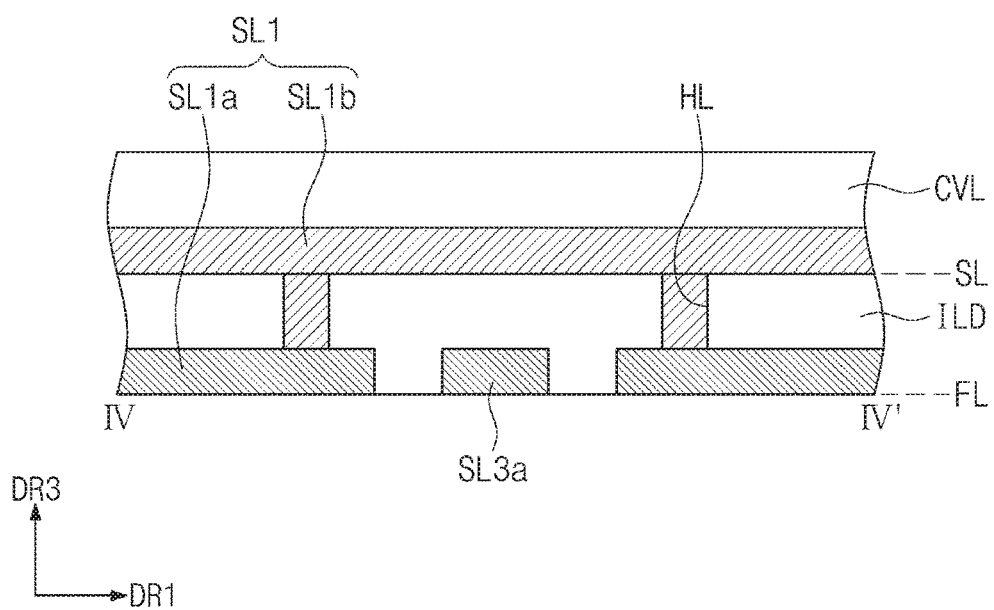
FIG. 15B is a sectional view corresponding to the line IV-IV' of FIG. 15A.
Figure 15C:
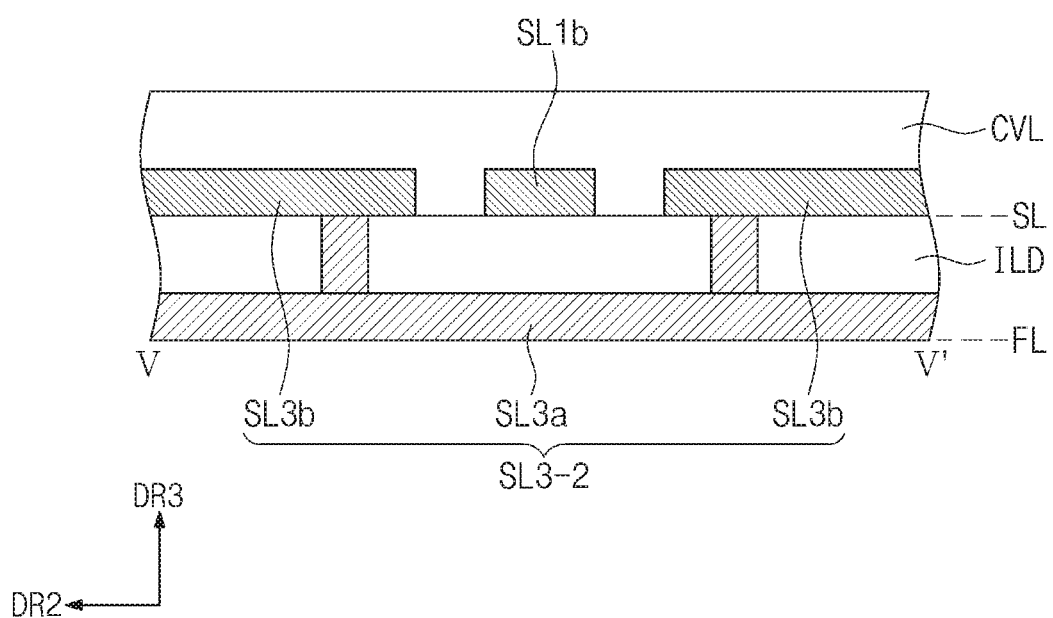
FIG. 15C is a sectional view corresponding to the line V-V' of FIG. 15A.

FIG. 15A is an enlarge plan view illustrating the portion BB' of the input sensor SU of FIG. 3, FIG. 15B is a sectional view corresponding to the line IV-IV' of FIG. 15A, and FIG. 15C is a sectional view corresponding to the line V-V' of FIG. 15A. In FIG. 15A, to reduce complexity in the drawings and to provide better understanding of the inventive concept, elements at the first level FL are illustrated by a dotted line and elements at the second level SL are illustrated in a solid line.

Referring to FIGS. 15A to 15C, the first wiring line SL1 may have a multi-layered structure including the first sub-wiring line SL1a and the second sub-wiring line SL1b, which are provided at the first and second levels FL and SL, respectively. In addition, a third wiring line SL3-2 may have a multi-layered structure including a first sub-wiring line SL3a and a second sub-wiring line SL3b, which are respectively provided at the first and second levels FL and SL. Furthermore, although not shown, the second wiring line SL2 (e.g., see FIG. 3) may be provided to have substantially the same layer structure as that of the first wiring line SL1.

In a region where the first sub-wiring line SL1a crosses the first sub-wiring line SL3a at the first level FL, the first sub-wiring line SL1a may have a cut shape. The cut portions of the first sub-wiring line SL1a may be electrically connected to each other by the second sub-wiring line SL1b provided at the second level SL.

In a region where the second sub-wiring line SL1b crosses the second sub-wiring line SL3b at the second level SL, the second sub-wiring line SL3b may have a cut shape. The cut portions of the second sub-wiring line SL3b may be electrically connected to each other by the first sub-wiring line SL3a provided at the first level FL.

Figure 16:
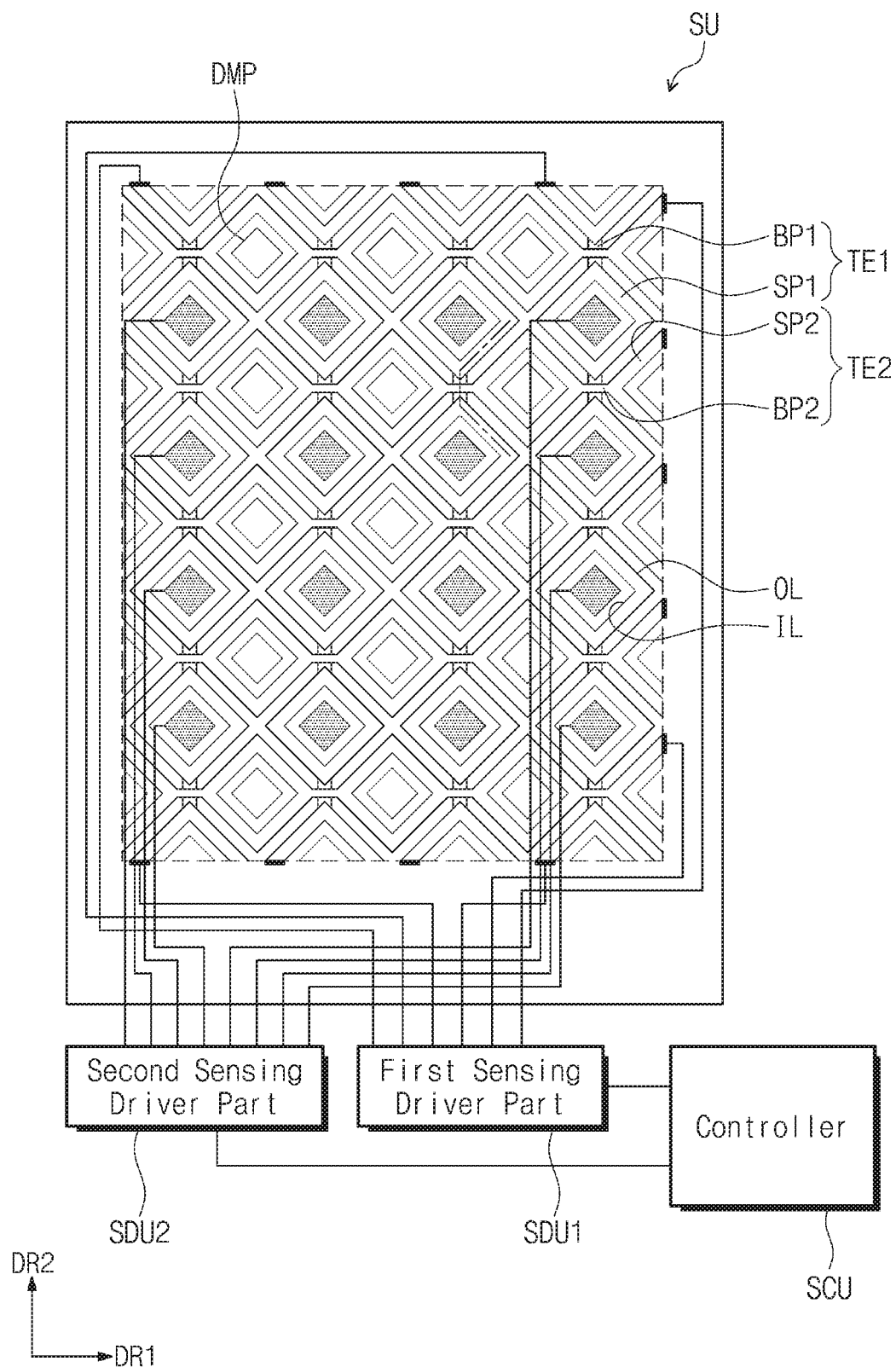
FIG. 16 is a diagram schematically illustrating a configuration of an electronic apparatus according to some embodiments of the inventive concept.

FIG. 16 is a diagram schematically illustrating a configuration of an electronic apparatus according to some embodiments of the inventive concept.

Referring to FIG. 16, the electronic apparatus EA (e.g., see FIG. 1) may include a first sensing driver part SDU1, which is electrically connected to the first and second sensor patterns SP1 and SP2 of the input sensor SU, a second sensing driver part SDU2, which is electrically connected to the third sensor patterns TE3, and a controller SCU, which is configured to control the first and second sensing driver parts SDU1 and SDU2. Each of the first sensing driver part SDU1, the second sensing driver part SDU2, and the controller SCU may be provided in the form of a circuit.

In some embodiments, the first and second sensing driver parts SDU1 and SDU2 may be simultaneously driven. In this case, the input sensor SU may sense a touch event in a mutual-capacitance manner using the first and second sensor patterns SP1 and SP2 and, simultaneously, may sense a touch event in a self-capacitance manner using the third sensor patterns TE3. That is, the input sensor SU may have technical advantages (e.g., the multi-touch sensing) in the mutual-capacitance sensing method as well as technical advantages (e.g., the non-touching type event sensing and high touch sensitivity) in the self-capacitance sensing method.

In certain embodiments, the first and second sensing driver parts SDU1 and SDU2 may be sequentially driven. An operation sequence and an operation timing of the first and second sensing driver parts SDU1 and SDU2 may be controlled by the controller SCU. For example, under the control of the controller SCU, the second sensing driver part SDU2 may be operated, and then, the first sensing driver part SDU1 may be operated. As an example, the second sensing driver part SDU2 of sensing a touch event using the self-capacitance sensing method may be firstly operated to approximately examine a position of a touch event, and then, the first sensing driver part SDU1 may be used to precisely determine the position of the touch event.

In certain embodiments, the first and second sensing driver parts SDU1 and SDU2 may be optionally driven. For example, if a touch sensing signal is weak, only the first sensing driver part SDU1 may be driven, or both of the first and second sensing driver parts SDU1 and SDU2 may be driven in the self-capacitance sensing method. If a touch sensing signal is strong, only the second sensing driver part SDU2 may be selected to be driven. An example of this will be described with reference to FIGS. 17 and 18.

Figure 17:
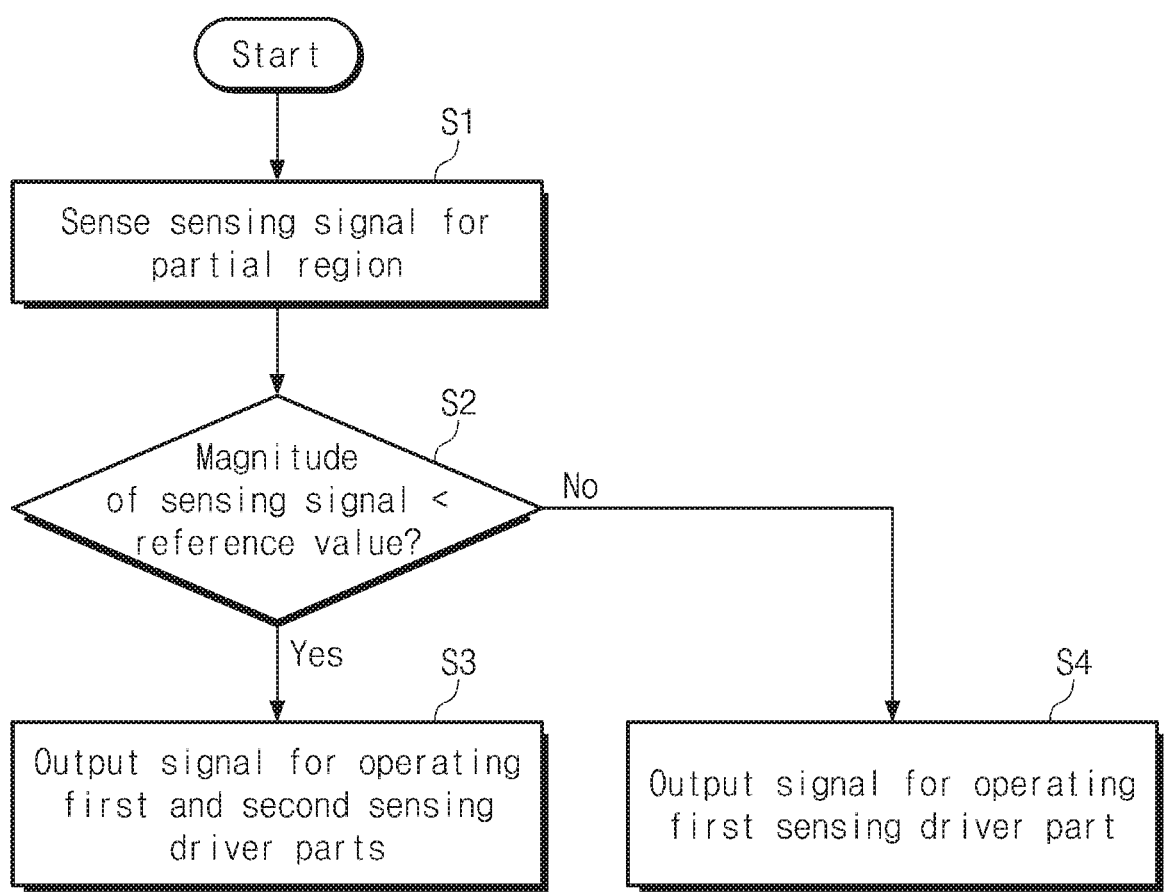
FIG. 17 is a flow chart illustrating an operation of an input sensor according to some embodiments of the inventive concept.

FIG. 17 is a flow chart illustrating an operation of an input sensor according to some embodiments of the inventive concept.

Referring to FIGS. 16 and 17, the input sensor SU may sense a sensing signal for a partial region (in S1). The partial region may be a predetermined region or may be a selected portion of the active region AA (e.g., less than a specific ratio in the entire area of the active region AA).

If the sensing signal from the partial region is sensed, the controller SCU may compare a magnitude of the sensing signal with a reference value (in S2). For example, the controller SCU may include a comparator for comparing the sensing signal with the reference value.

In the case where the magnitude of the sensing signal is smaller than the reference value, the controller SCU may output a signal for operating the first and second sensing driver parts SDU1 and SDU2 (in S3). However, the inventive concept is not limited thereto, and in certain embodiments, if the magnitude of the sensing signal is smaller than the reference value, the controller SCU may output a signal for operating only the second sensing driver part SDU2.

In the case where the magnitude of the sensing signal is greater than the reference value, the controller SCU may output a signal for operating the first sensing driver part SDU1 (in S4). However, the inventive concept is not limited thereto, and in certain embodiments, if the magnitude of the sensing signal is greater than the reference value, the controller SCU may output a signal of operating the first and second sensing driver parts SDU1 and SDU2.

Figure 18:
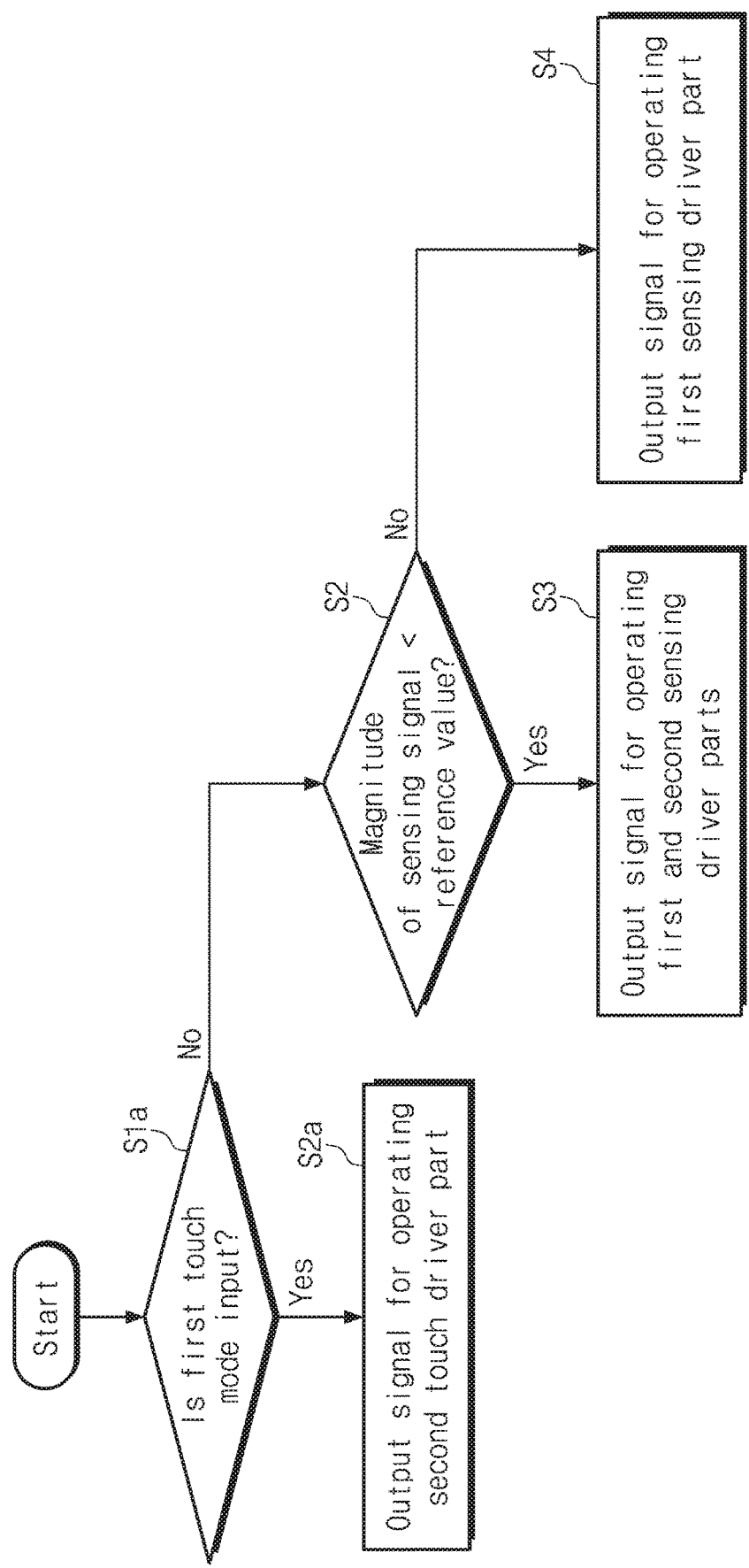
FIG. 18 is a flow chart illustrating an operation of an input sensor according to some embodiments of the inventive concept.

FIG. 18 is a flow chart illustrating an operation of an input sensor according to some embodiments of the inventive concept.

Referring to FIGS. 16 and 18, the controller SCU may be configured to determine whether a first touch mode is input (in S1a). The first touch mode may be input by a user. In the case where the first touch mode is input, the controller SCU may be configured to output a signal for operating the second touch driver part (in S2a). The first touch mode may be one of special touch modes. For example, the first touch mode may be a mode for enhancing the sensitivity of a touch event produced by a user wears gloves.

If the first touch mode is not input, the controller SCU may be operated in the same manner as that described with reference to FIG. 17.

In other words, the input sensor SU may be operated in one of the first mode, in which both of the first and second sensing driver parts SDU1 and SDU2 are driven, the second mode, in which the first and second sensing driver parts SDU1 and SDU2 are driven in an alternate manner, the third mode, in which only the first sensing driver part SDU1 is driven, and the fourth mode, in which only the second sensing driver part SDU2 is driven.

According to some embodiments of the inventive concept, an input sensor is configured to sense a touch event using both of mutual-capacitance and self-capacitance sensing methods. Here, the self-capacitance sensing method may be advantageous in terms of non-touching type event sensing and touch sensitivity, and the mutual-capacitance sensing method may be advantageous in terms of multi-touch sensing. That is, the input sensor and an electronic apparatus therewith may have all of these technical advantages.

While example embodiments of the inventive concepts have been particularly shown and described, it will be understood by one of ordinary skill in the art that variations in form and detail may be made therein without departing from the spirit and scope of the attached claims.

What is claimed is:

1. An electronic apparatus, comprising:
a plurality of first sensor patterns and a plurality of second sensor patterns, each of which includes an outer line and an inner line;
a plurality of first connection patterns electrically connecting the plurality of first sensor patterns;
a plurality of second connection patterns electrically connecting the plurality of second sensor patterns, the second connection patterns being provided at a level different from that of the plurality of first connection patterns;
a third sensor pattern; and
a wiring line connected to the third sensor pattern,
wherein the inner lines of the plurality of first sensor patterns and the plurality of second sensor patterns enclose internal regions, respectively, the third sensor pattern is electrically disconnected from the plurality of first sensor patterns and the plurality of second sensor patterns, and the third sensor pattern is provided in at least one of the internal regions, when viewed in a plan view.

2. The electronic apparatus of claim 1, wherein the plurality of first sensor patterns and the plurality of second sensor patterns are provided to sense a touch event from an outside, using a variation in mutual-capacitance therebetween, and the third sensor pattern is configured to sense a touch event from an outside, using a variation in self-capacitance thereof.

3. The electronic apparatus of claim 1, further comprising an insulating layer provided between the plurality of first connection patterns and the plurality of second connection patterns,
   wherein the plurality of first connection patterns and the wiring line are provided at a first level below the insulating layer,
   the plurality of first sensor patterns, the plurality of second sensor patterns, and the plurality of second connection patterns are provided at a second level on the insulating layer, and
   the plurality of first sensor patterns are electrically connected to the plurality of first connection patterns.

4. The electronic apparatus of claim 3, wherein the third sensor pattern comprises:
   a first sub-sensor pattern provided at the first level and connected to the wiring line; and
   a second sub-sensor pattern provided at the second level, wherein the second sub-sensor pattern is electrically connected to one another by the first sub-sensor pattern.

5. The electronic apparatus of claim 3, wherein the third sensor pattern is located at the second level, and
   the third sensor pattern is electrically connected to the wiring line.

6. The electronic apparatus of claim 3, wherein the third sensor pattern is located at the first level, and
   when viewed in a plan view, the third sensor pattern is not overlapped with the plurality of first sensor patterns and the plurality of second sensor patterns.

7. The electronic apparatus of claim 3, further comprising a dummy pattern provided in at least one of the internal regions, when viewed in a plan view,
   wherein, when viewed in a plan view, the third sensor pattern is not overlapped with the dummy pattern.

8. The electronic apparatus of claim 7, wherein the dummy pattern is located at the second level.

9. The electronic apparatus of claim 3, wherein, when viewed in a plan view, the third sensor pattern is provided in a plurality, and each of the plurality of third sensor patterns is provided in each of at least two of the internal regions in a one-to-one corresponding manner.

10. The electronic apparatus of claim 3, wherein, when viewed in a plan view, the third sensor pattern is provided in a plurality, and the plurality of third sensor patterns are provided in one of the internal regions.

11. The electronic apparatus of claim 3, wherein, when viewed in a plan view, the third sensor pattern is provided in a plurality, each of the plurality of third sensor patterns is provided in each of at least two of internal regions in a one-to-one corresponding manner, and the plurality of third sensor patterns are electrically connected to each other, thereby constituting a single sensor electrode.

12. The electronic apparatus of claim 1, further comprising:
    a first sensing driver part electrically connected to the plurality of first sensor patterns and the plurality of second sensor patterns; and
    a second sensing driver part electrically connected to the third sensor pattern,
    wherein the first sensing driver part and the second sensing driver part are simultaneously driven to sense a touch event using the plurality of first sensor patterns, the plurality of second sensor patterns, and the third sensor pattern.

13. The electronic apparatus of claim 1, further comprising:
    a first sensing driver part electrically connected to the plurality of first sensor patterns and the plurality of second sensor patterns;
    a second sensing driver part electrically connected to the third sensor pattern; and
    a controller controlling the first sensing driver part and the second sensing driver part,
    wherein the first sensing driver part and the second sensing driver part are driven in a first mode, in which the first sensing driver part and the second sensing driver part are simultaneously driven, a second mode, in which the first sensing driver part and the second sensing driver part are alternately driven, a third mode, in which only the first sensing driver part is driven, or a fourth mode, in which only the second sensing driver part is driven.

14. An electronic apparatus, comprising:
    a display panel displaying an image;
    self-capacitance sensor patterns provided on the display panel, each of the self-capacitance sensor patterns being used to sense an external touch event using a variation in self-capacitance thereof; and
    first sensor patterns and second sensor patterns provided on the display panel, an opening overlapped with the self-capacitance sensor patterns being defined in each of the first and second sensor patterns, when viewed in a plan view,
    wherein the first sensor patterns and the second sensor patterns are configured to sense an external touch event using a variation in mutual-capacitance therebetween, and
    wherein each of the self-capacitance sensor patterns spaces apart from the first sensor patterns and the second sensor patterns.

15. The electronic apparatus of claim 14, wherein, when viewed in a plan view, the self-capacitance sensor patterns are overlapped with the openings of some patterns of the first sensor patterns and the second sensor patterns in a one-to-one corresponding manner.

16. The electronic apparatus of claim 14, wherein, when viewed in a plan view, the opening of one of the first sensor patterns or the second sensor patterns is overlapped with the self-capacitance sensor patterns.

17. The electronic apparatus of claim 14, wherein two or more adjacent self-capacitance sensor patterns are connected to each other, thereby constituting a single sensor electrode.

18. The electronic apparatus of claim 14, wherein each of the self-capacitance sensor patterns comprises:
    a first sub-sensor pattern provided on the display panel; and
    a second sub-sensor pattern connected to the first sub-sensor pattern through a contact hole formed in an insulating layer which is provided to cover the first sub-sensor pattern,
    wherein the second sub-sensor pattern is provided at the same level as the first sensor patterns and the second sensor patterns.

19. An input sensor, comprising:
    a plurality of dummy patterns;
    a plurality of sensor patterns electrically disconnected from the plurality of dummy patterns, each of the plurality of sensor patterns being provided to enclose each of the plurality of dummy patterns; and wiring lines electrically connected to at least one of the plurality of dummy patterns, wherein the plurality of dummy patterns comprise operation dummy patterns connected to the wiring lines, and the operation dummy patterns are used to sense a touch event from an outside using a variation in self-capacitance thereof.

20. The input sensor of claim 19, wherein the plurality of sensor patterns are used to sense a touch event from an outside using a variation in mutual-capacitance therebetween.

\* \* \* \* \*